(12) United States Patent
Dewa et al.

(10) Patent No.: US 10,798,449 B2
(45) Date of Patent: Oct. 6, 2020

(54) INFORMATION PROCESSING APPARATUS AND INFORMATION PROCESSING METHOD FOR VALIDATING AN APPLICATION

(71) Applicant: Sony Corporation, Tokyo (JP)

(72) Inventors: Yoshiharu Dewa, Tokyo (JP); Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/103,434

(22) PCT Filed: Nov. 18, 2014

(86) PCT No.: PCT/JP2014/005782
§ 371 (c)(1),
(2) Date: Jun. 10, 2016

(87) PCT Pub. No.: WO2015/104743
PCT Pub. Date: Jul. 16, 2015

(65) Prior Publication Data
US 2016/0316260 A1    Oct. 27, 2016

(30) Foreign Application Priority Data
Jan. 7, 2014    (JP) .................... 2014-000999

(51) Int. Cl.
*H04N 21/4627*    (2011.01)
*H04N 21/443*    (2011.01)
(Continued)

(52) U.S. Cl.
CPC ........... *H04N 21/443* (2013.01); *G06F 21/10* (2013.01); *H04N 21/2541* (2013.01);
(Continued)

(58) Field of Classification Search
CPC ......... H04N 21/6334; H04N 21/44204; H04N 21/2541; H04N 21/4627; H04N 21/443; G06F 21/10
See application file for complete search history.

(56) References Cited

U.S. PATENT DOCUMENTS 5,375,206 A * 12/1994 Hunter ................ G06F 21/10
717/176
6,157,719 A * 12/2000 Wasilewski ............ H04L 63/04
348/E5.004
(Continued)

FOREIGN PATENT DOCUMENTS

| CN | 1947422 A | 4/2007 |
| JP | 2013-8374 A | 1/2013 |

(Continued)

OTHER PUBLICATIONS

International Search report dated Feb. 24, 2015 in PCT/JP2014/005782, filed Nov. 18, 2014.
(Continued)

*Primary Examiner* — Nasser M Goodarzi
*Assistant Examiner* — Patrick A Ryan
(74) *Attorney, Agent, or Firm* — Oblon, McClelland, Maier & Neustadt, L.L.P.

(57) ABSTRACT

Provided is an information processing apparatus, including: a broadcast receiver capable of receiving a broadcast signal; and a controller configured to obtain at least information used to control an operation of an application, the application using a broadcast signal received by the broadcast receiver, and an application information table describing information on an expire date, to determine if the expire date of the obtained application information table is expired or not based on information on the expire date, and to invalidate start of the application based on the application infor- (Continued)

mation table if the controller determines that the expire date is expired.

11 Claims, 36 Drawing Sheets

(51) Int. Cl.
*H04N 21/6334* (2011.01)
*G06F 21/10* (2013.01)
*H04N 21/254* (2011.01)
*H04N 21/442* (2011.01)

(52) U.S. Cl.
CPC ... *H04N 21/44204* (2013.01); *H04N 21/4627* (2013.01); *H04N 21/6334* (2013.01)

(56) References Cited

U.S. PATENT DOCUMENTS

| | | | | |
|---|---|---|---|---|
| 7,840,812 | B1* | 11/2010 | Levenberg | H04L 63/0823 713/150 |
| 8,867,401 | B1* | 10/2014 | Tomay | H04N 21/25808 370/228 |
| 8,887,230 | B2* | 11/2014 | Barton | H04L 41/046 726/1 |
| 9,332,292 | B2* | 5/2016 | Gavade | H04N 21/26258 |
| 9,756,041 | B2* | 9/2017 | Anand | H04L 63/0807 |
| 2007/0223392 | A1* | 9/2007 | Kim | H04N 7/163 370/252 |
| 2010/0268950 | A1* | 10/2010 | Qu | G06F 21/10 713/168 |
| 2011/0093895 | A1 | 4/2011 | Lee et al. | |
| 2016/0371472 | A1* | 12/2016 | Walsh | H04L 63/102 |

FOREIGN PATENT DOCUMENTS

| | | |
|---|---|---|
| JP | 2013-98859 A | 5/2013 |
| WO | 2005/104558 A1 | 11/2005 |
| WO | 2013/065278 A1 | 5/2013 |
| WO | WO 2013/065279 A1 | 5/2013 |

OTHER PUBLICATIONS

Extended European Search Report issued in European Application No. 14878365.7 dated Jul. 20, 2017.
Office Action dated Oct. 9, 2018 in corresponding Japanese Patent Application No. 2015-556631, pages.
Combined Chinese Office Action and Search Report dated Aug. 31, 2018 in corresponding Chinese Patent Application No. 201480071957.3 (with English Translation), 14 pages.
Chinese Office Action dated Apr. 18, 2019 in Chinese Patent Application No. 2014800719573 with translation.

* cited by examiner

FIG.2

| field | Description |
|---|---|
| appName | Application name |
| applicationId | Application identifier |
| applicationDescriptor | Application descriptor |
| applicationType | Application type |
| controlCode | Application control code instructing startup and quitting, etc. |
| visibility | Application visibility/invisibility specifier |
| serviceBound | Flag showing if application is in association with service |
| priority | Application priority |
| version | Application version |
| icon | Icon information |
| storageCapability | Information used by receiver apparatus to record or cache application |
| applicationTransport | HTTP TransportType specifier |
| applicationLocation | Application location URL |
| applicationBoundary | Application boundary information |
| applicationSpecificDescriptor | Information depending on application type |
| applicationUsageDescriptor | Kind of application (EPG etc.) |
| broadcastResourcePermissionDescriptor | Use-permission information descriptor |
| expireDate | Expire date |
| parentAppID | Parent application ID |
| applicationHashDescriptor | Application hash value |
| applicationTypeDescriptor | Application type descriptor |

| Element/attribute | Frequency | Definition |
|---|---|---|
| Service_permission | 1..n | |
| @scope | 1 | Permission specifying unit "all","affiliate", "broadcaster","service","event","series" |
| @network_id | 0..1 | Network ID |
| @transport_stream_id | 0..1 | Transport stream ID |
| @service_id | 0..1 | Service ID |
| @event_id | 0..1 | Event ID |
| @series_id | 0..1 | Series ID |
| @affiliation_id | 0..1 | Affiliation ID |
| @broadcaster_id | 0..1 | Broadcaster ID |
| permission | 1 | Permission bitmap |
| Overlay_Permission_error_behaviour | 0..1 | Behavior during permission error "app_off","video-off","app_suspend" |
| Overlay_area | 0..1 | Screen area of overlay-displayed application |
| area | n | |
| @areaId | 1 | Area ID |
| @elementId | 0..1 | ID of element of HTML application |
| @upper_left_horizontal | 0..1 | Area upper-left horizontal coordinate (pixel) |
| @upper_left_vertical | 0..1 | Area upper-left vertical coordinate (pixel) |
| @horizontal_size | 0..1 | Area horizontal size |
| @vertical_size | 0..1 | Area vertical size |

FIG.3

| Data structure | Number of bits | Description of bit sequence |
|---|---|---|
| application_information_section() { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     application_type | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptors_length | 12 | uimsbf |
|     for(i=0;i<N;i++){ | | |
|         descriptor() | | |
|     } | | |
|     reserved_future_use | 4 | bslbf |
|     application_loop_length | 12 | uimsbf |
|     for(i=0;i<N;i++){ | | |
|         application_identifier() | | |
|         application_control_code | 8 | uimsbf |
|         reserved_future_use | 4 | bslbf |
|         application_descriptors_loop_length | 12 | uimsbf |
|         for(j=0;j<M;j++){ | | |
|             descriptor() | | |
|         } | | |
|     } | | |
|     CRC_32 | 32 | rpchof |
| } | | |

FIG.4

| Data structure | Number of bits | Description of bit sequence |
|---|---|---|
| External_application_control_descriptor(){ | | |
|   descriptor_tag | 8 | uimsbf |
|   descriptor_length | 8 | uimsbf |
|   permission_bitmap_count | 8 | |
|   for(i=0;i<permission_bitmap_count;i++){ | | |
|     permission_bitmap | 8 | |
|   } | | |
|   overlay_admission_polarity | 1 | |
|   overlay_contolled_area_count | 4 | |
|   reserved | 3 | |
|   for(i=0;i<overlay_controlled_area_count;i++} | | |
|     overlay_controlled_area_tag | 8 | |
|     upper_left_horizontal | 8 | |
|     upper_left_vertical | 8 | |
|     horizontal_size | 8 | |
|     vertical_size | 8 | |
|   } | | |
|   bw_application_list_count | | |
|   for(i=0;i<bw_application_list_count;j++} | | |
|     application_identifier() | 48 | |
|     black_white_polarity | 1 | |
|     reserved | 7 | |
|   } | | |
| } | | |

The "58" annotation points to the permission_bitmap_count and for-loop block.

FIG.5

| Code | Identification name | Meaning |
|---|---|---|
| 0x00 | | reserved_future_use |
| 0x01 | AUTOSTART | Application is automatically started when service is selected. (This is not applied when application is already executed) |
| 0x02 | PRESENT | Show that application is executable when service is selected. Note that application is not started automatically |
| 0x03 | DESTROY | Application finishes processing |
| 0x04 | KILL | Application finishes processing immediately |
| 0x05 | PREFETCH | Application file group is cached if receiver can. Application is not started |
| 0x06 | REMOTE | Show that application is not in current transport stream. If another stream is selected, application may be obtained |
| 0x07 | DISABLED | Show that start of application is restricted |
| 0x08 | PLAYBACK_AUTOSTART | If receiver reproduces from storage, application is started similar to AUTOSTART |
| 0x09 to 0xFF | | reserved_future_use |

FIG.6

Overlay area created based on use-permission information descriptor of XML-AIT
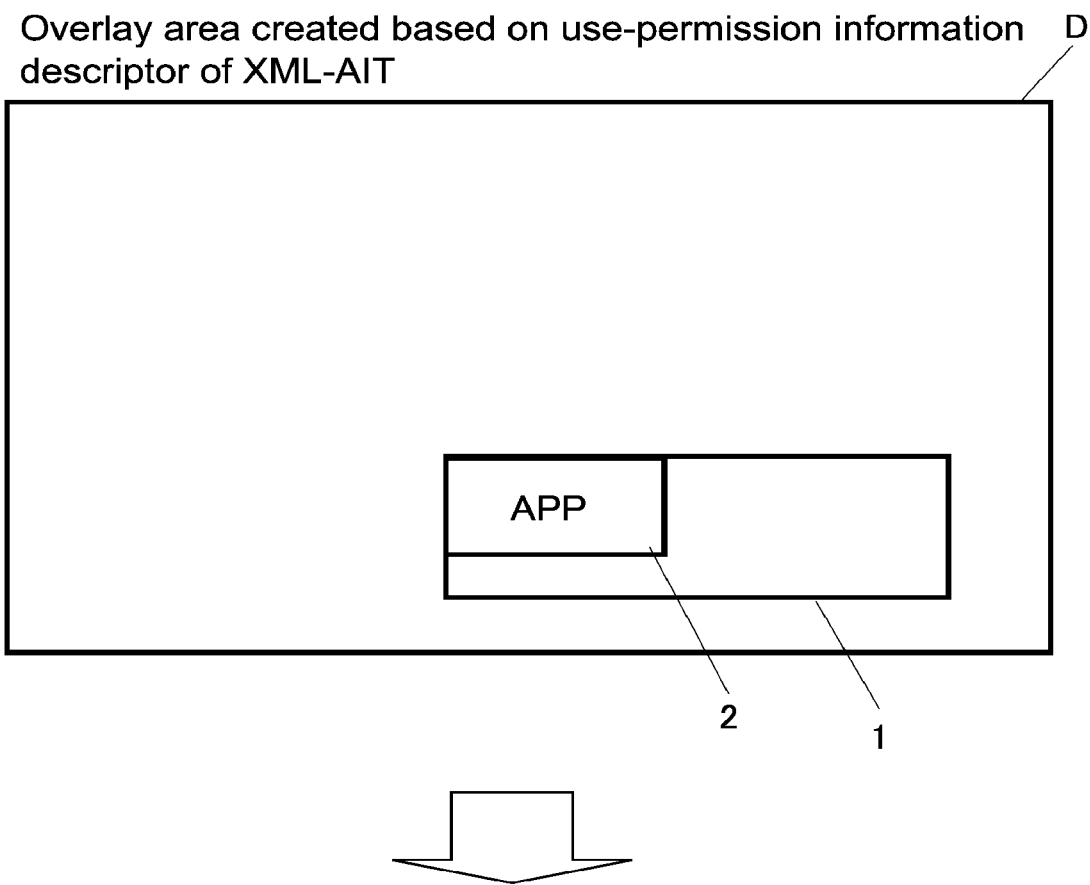
Overlay area created based on external application control descriptor of section AIT
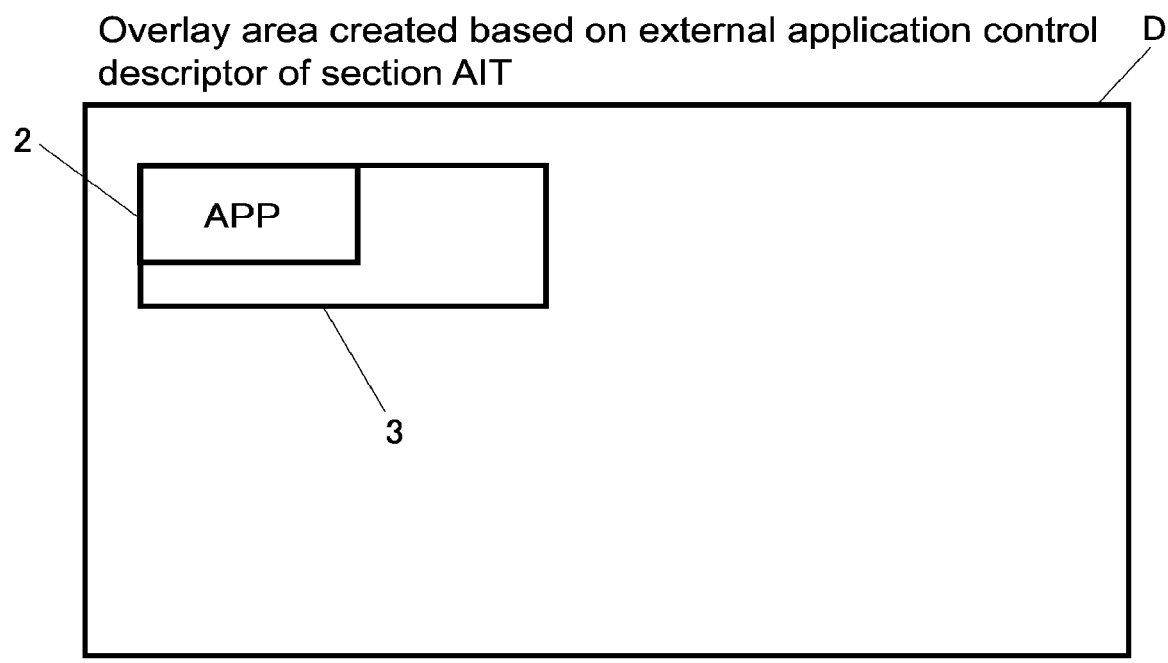
FIG.15

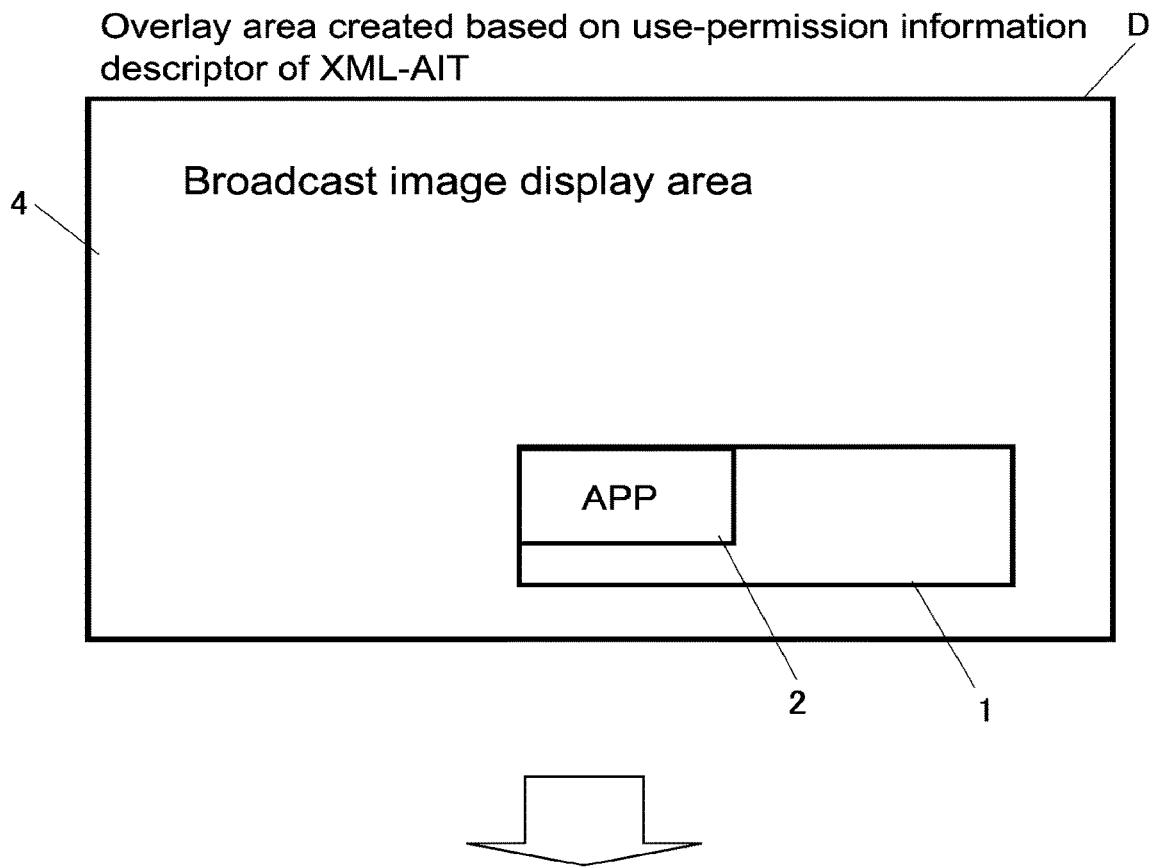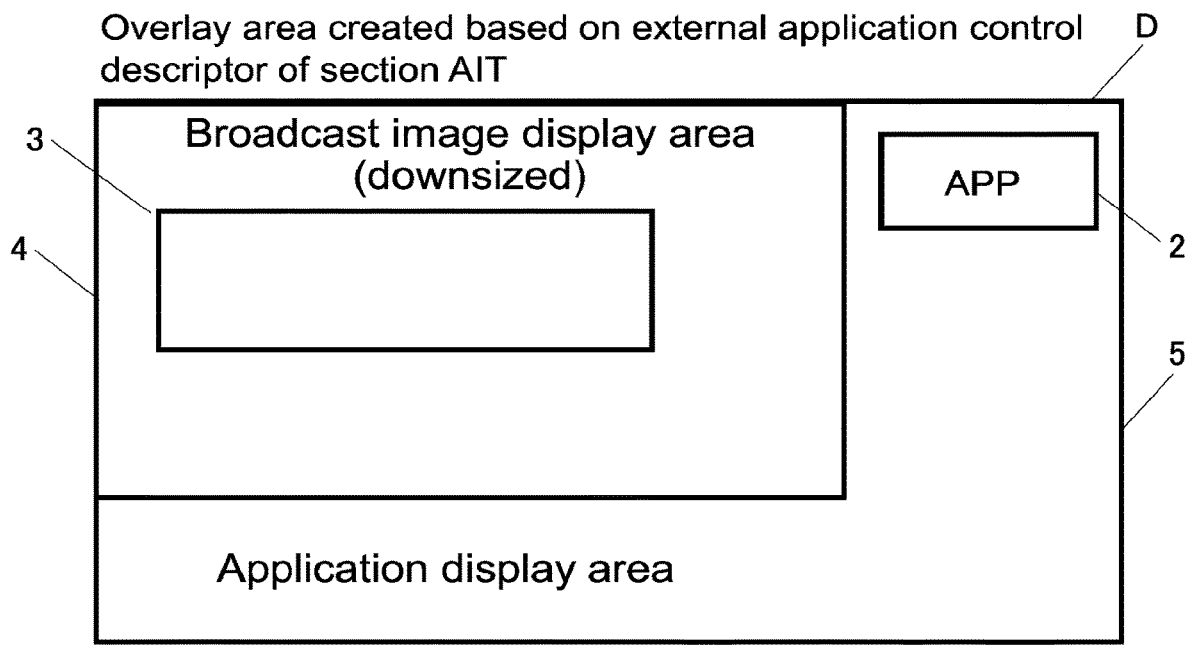
FIG.16

Overlay area created based on use-permission information descriptor of XML-AIT
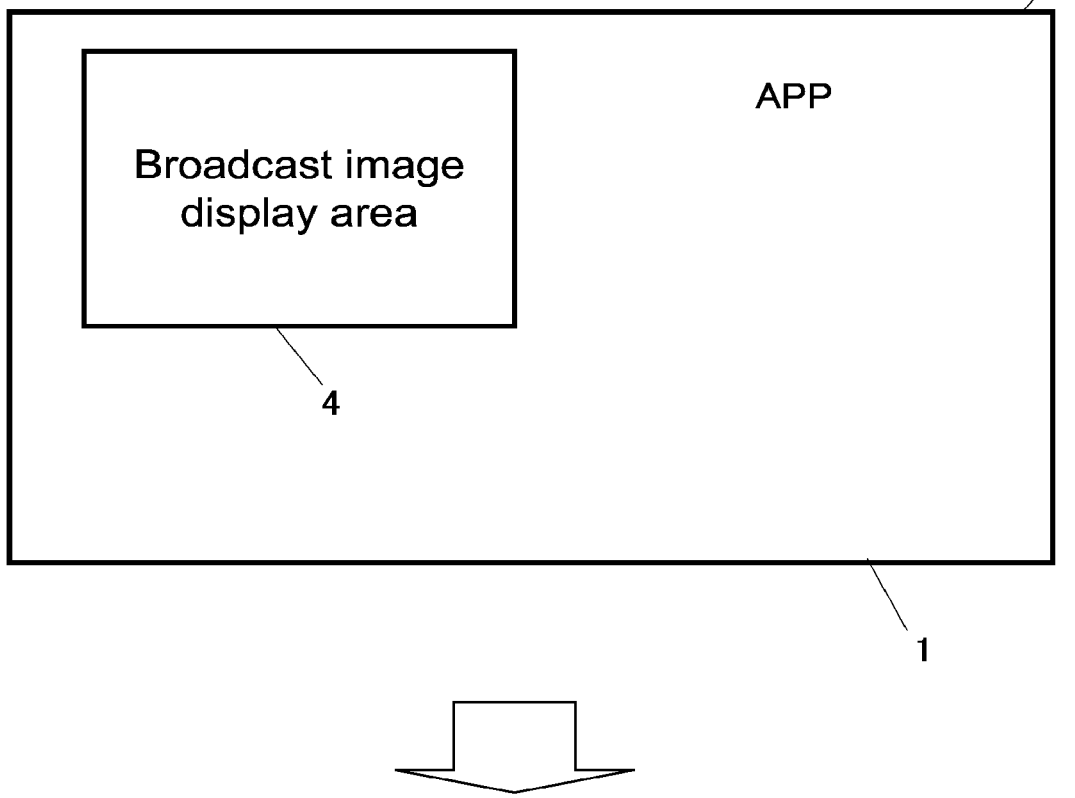
Overlay area created based on external application control descriptor of section AIT
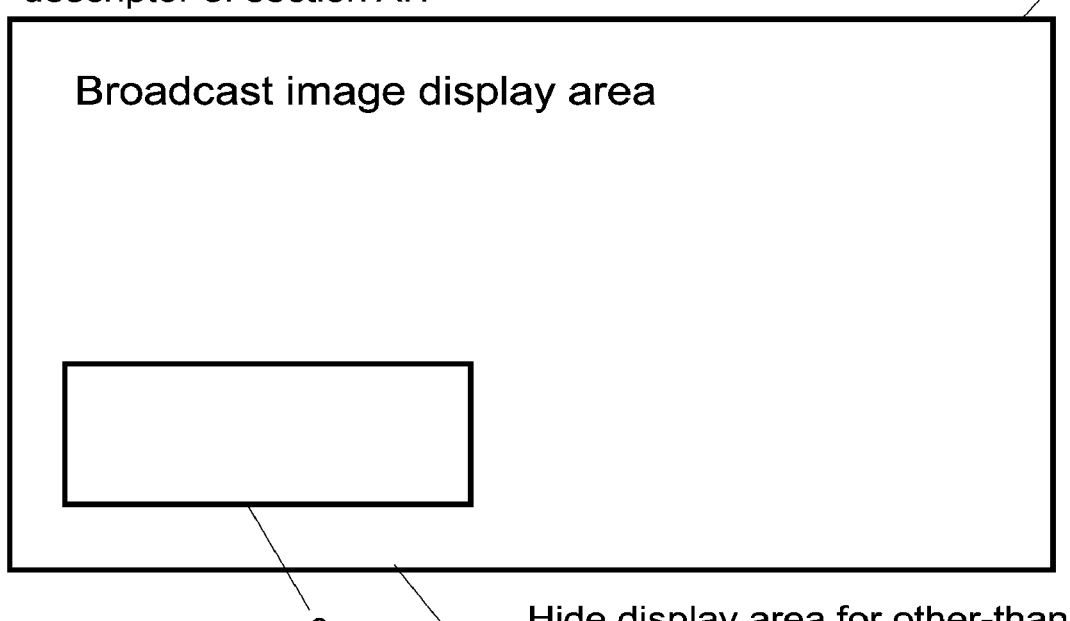
Hide display area for other-than-broadcast-managed application
FIG.17

| Data structure | Number of bits | Description of bit sequence |
|---|---|---|
| broadcast certificate_descriptor {    descriptor_tag    descriptor_length    broadcaster_certificate_id    broadcaster_certificate_version } | 8 8 16 16 | uimsbf uimsbf uimsbf uimsbf |

FIG.20

| Data structure | Number of bits | Description of bit sequence |
|---|---|---|
| root_certificate_descriptor { | | |
|     descriptor_tag | 8 | uimsbf |
|     descriptor_length | 8 | uimsbf |
|     root_certificate_type | 1 | bslbf |
|     reserved | 7 | bslbf |
|     if( root_certificate_type == 0) { | | |
|         for( i=0; i<8; i++ ) { | | |
|             root_certificate_id | 32 | uimsbf |
|             root_certificate_version | 32 | uimsbf |
|         } | | |
|     } else if( root_certificate_type == 2 ) { | | |
|         for( i=0; i<8; i++ ) { | | |
|             broadcaster_certificate_id | 32 | uimsbf |
|             broadcaster_certificate_version | 32 | uimsbf |
|         } | | |
|     } else { | | |
|         for( i=0; i<8; i++ ) { | | |
|             reserved | 64 | bslbf |
|         } | | |
|     } | | |
| } | | |

FIG.22

| Data structure | Number of bits | Description of bit sequence |
|---|---|---|
| root_certificate_descriptor { | | |
|    descriptor_tag | 8 | uimsbf |
|    descriptor_length | 8 | uimsbf |
|    root_certificate_type | 1 | bslbf |
|    broadcaster_certificate_flag | 1 | bslbf |
|    reserved | 6 | bslbf |
|    if( root_certificate_type == 0) { | | |
|       for( i=0; i<8; i++ ) { | | |
|          root_certificate_id | 32 | uimsbf |
|          root_certificate_version | 32 | uimsbf |
|       } | | |
|    } else { | | |
|       for( i=0; i<8; i++ ) { | | |
|          reserved | 64 | bslbf |
|       } | | |
|    } | | |
| } | | |

FIG.24

| Element/attribute | Frequency | Definition |
|---|---|---|
| applicationType | 1 | |
| @area_type | 1 | "whole" , "partial" , "invisible" |
| @format_type | 1 | "packaged" , "web" |
| @context_type | 1 | "application" , "tv" |

FIG.28

INFORMATION PROCESSING APPARATUS AND INFORMATION PROCESSING METHOD FOR VALIDATING AN APPLICATION

TECHNICAL FIELD

The present technology relates to an information processing apparatus and an information processing method capable of presenting broadcast content and executing an application by using an application information table.

BACKGROUND ART

Recently, there is known a technology capable of reproducing broadcast content and executing an application, which is delivered via a network such as the Internet, simultaneously. As such a technology, there is known a technology called Hybrid Broadcast Broadband TV (hereinafter, referred to as "HbbTV".). As HbbTV standard, "ETSI TS 102 796" (see Non-patent Document 1) is developed in Europe. Further, "IPTVFJ STD-0010" (see Non-patent Document 2) standard and "IPTVFJ STD-0011" (see Non-patent Document 3) standard, which correspond to "ETSI TS 102 796", are developed in Japan.

For example, the HbbTV system reproduces broadcast content and executes an application simultaneously. In such a system, a data structure called AIT section (Application Information Table) controls a life cycle of an application. The life cycle of an application means the period from the start to the end of an application. The AIT section is superimposed on broadcast content. An information terminal obtains the AIT section. The information terminal controls an application based on a code for controlling the application, which is contained in the AIT section.

Further, there is known an XML-AIT described in XML format. The XML-AIT has information similar to the information that the broadcast AIT section has. The XML format is suitable to provide information on an application to a receiver apparatus by using a communication network such as the Internet.

Non-patent Document 1: ETSI (European Communications Standards Institute) "ETSI TS 102 796 V1.1.1 (2010-06)" http://www.etsi.org/deliver/etsi_ts/102700_102799/102796/01.01.01_60/ts_102796v010101p.pdf (browsed on Oct. 21, 2011)

Non-patent Document 2: IPTV Forum Japan "Integrated Broadcast-Broadband System Specification Version 1.0" https://www.iptvforum.jp/download/input.html (browsed on Dec. 4, 2013)

Non-patent Document 3: IPTV Forum Japan "IPTVFJ STD-0011 HTML5 Browser Specification Version 1.0" https://www.iptvforum.jp/download/input.html (browsed on Dec. 4, 2013)

SUMMARY OF INVENTION

Problem to be Solved by the Invention

It is assumed that providers other than broadcast stations might provide applications, each of which uses a broadcast program in some form, in the future. Examples of a provider other than broadcast stations include a manufacturer of terminal devices and an application provider such as a third party. Hereinafter, such an application will be referred to as "other-than-broadcast-managed application".

However, if a service using such an other-than-broadcast-managed application is put into effect in actuality, there still remain various problems to be solved. It is desirable to solve such problems.

In view of the above-mentioned circumstances, it is desirable to provide an information processing apparatus and an information processing method capable of improving the quality of a service using an other-than-broadcast-managed application.

Means for Solving the Problems

To solve the problems described above, there is provided an information processing apparatus, including:
a broadcast receiver capable of receiving a broadcast signal; and
a controller configured
to obtain at least
information used to control an operation of an application, the application using a broadcast signal received by the broadcast receiver, and
an application information table describing information on an expire date,
to determine if the expire date of the obtained application information table is expired or not based on information on the expire date, and
to invalidate start of the application based on the application information table if the controller determines that the expire date is expired.

The controller may be configured
to store the application information table obtained the latest, and
to determine if the expire date of the application information table is expired or not based on the information on the expire date, the information being described in the stored application information table.

The controller may be configured to determine if the expire date of the application information table is expired or not if a user selects the application to be started.

The controller may be configured to control operation of the application based on the stored application information table when the information processing apparatus is offline.

The controller may be configured to obtain the application via communication.

The controller may be configured to obtain the application information table via communication.

According to the present technology, there is provided an information processing method, including:
by a controller,
obtaining at least
information used to control an operation of an application, the application using a broadcast signal, and
an application information table describing information on an expire date;
determining if the expire date of the obtained application information table is expired or not based on information on the expire date; and
invalidating start of the application based on the application information table if the controller determines that the expire date is expired.

Effects of the Invention

As described above, according to the present technology, it is possible to improve the quality of the service using an other-than-broadcast-managed application.

BRIEF DESCRIPTION OF DRAWINGS

FIG. 2 A diagram showing a data structure of an XML-AIT.

FIG. 3 A diagram showing a syntax of a use-permission information descriptor.

FIG. 4 A diagram showing a data structure of a section AIT.

FIG. 5 A diagram showing a syntax of an external application control descriptor.

FIG. 6 A diagram showing a definition of an application control code.

FIG. 15 A diagram showing a first example of updating an overlay area.

FIG. 16 A diagram showing a second example of updating an overlay area.

FIG. 17 A diagram showing a third example of updating an overlay area.

FIG. 20 A diagram showing a configuration of a broadcast station public key certificate descriptor.

FIG. 22 A diagram showing a structure of a root certificate descriptor of a data broadcast extension method (first example).

FIG. 24 A diagram showing a structure of a root certificate descriptor of a data broadcast extension method (second example).

FIG. 28 A diagram showing a syntax of an application type descriptor.

MODE FOR CARRYING OUT THE INVENTION

Hereinafter, an embodiment of the present technology will be described with reference to the drawings.

First Embodiment

[Information Processing System]

Figure 1:
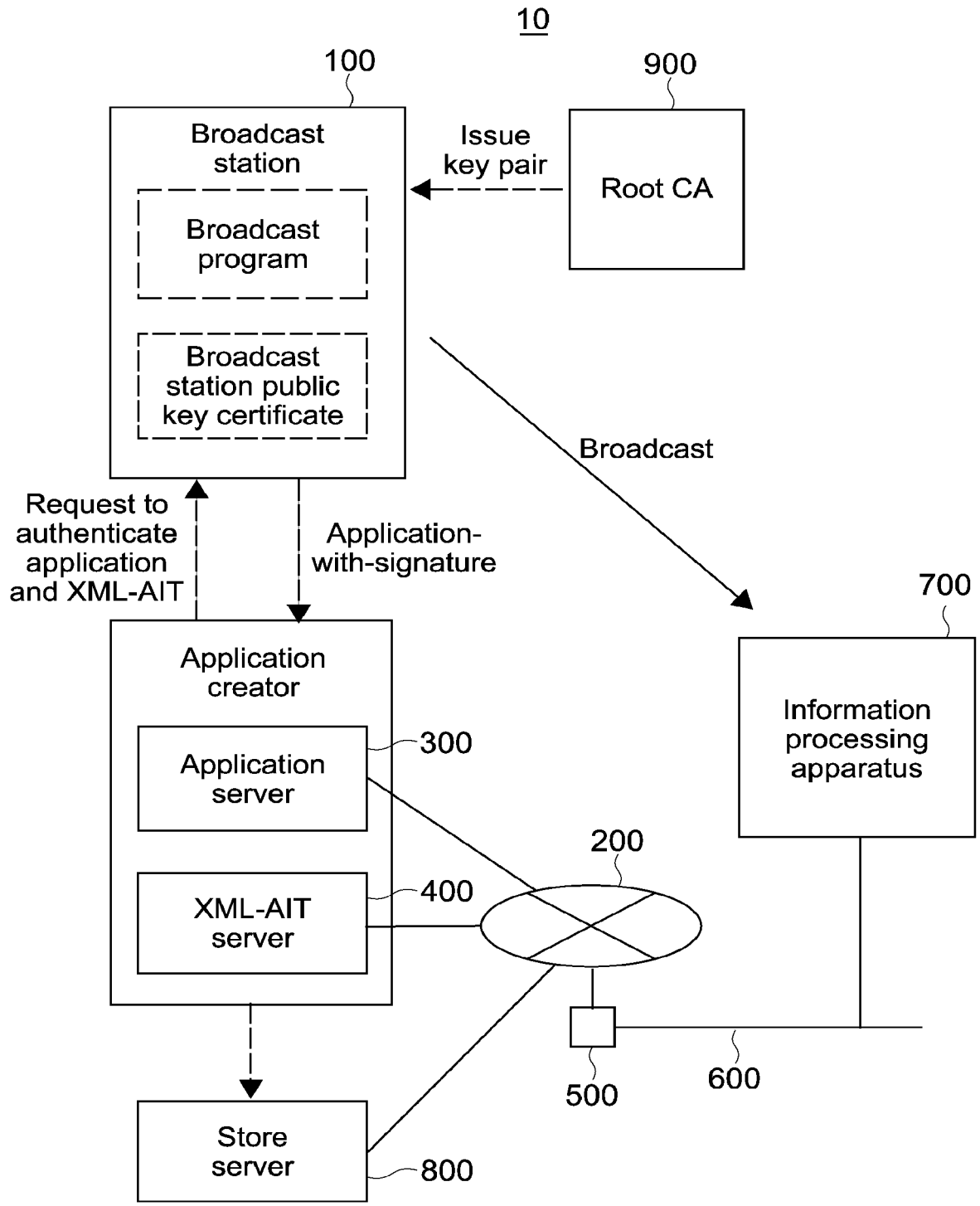
FIG. 1 A diagram schematically showing an information processing system of this embodiment.

FIG. 1 is a diagram showing the configuration of an information processing system of this embodiment.

An information processing system 10 of this embodiment includes a broadcast station 100, a first network 200 such as the Internet, an application server 300, an XML-AIT server 400, an edge router 500, a second network 600 such as a LAN (Local Area Network), an information processing apparatus 700 as a broadcasting receiver, and a store server 800.

The broadcast station 100 (broadcast equipment) includes a broadcast facility (broadcast unit) configured to send digital broadcast signals via a communication medium such as terrestrial waves, satellite waves, and an IP (Internet Protocol) network. The broadcast station 100 transmits an AV stream and a so-called broadcast stream. The AV stream is obtained by multiplexing an image transport stream, a sound transport stream, a subtitle transport stream, and the like. The broadcast stream is obtained by superimposing data, which accompanies the AV stream, and the like. Examples of the data, which accompanies an AV stream, include a broadcast-managed application, a section-format AIT (Application Information Table), and the like. The broadcast-managed application is described in a markup language such as HTML and BML, or in a script language such as Java (registered trademark) script. The section-format AIT is configured to control the operation of the running other-than-broadcast-managed application. Hereinafter, the AIT will be referred to as "section AIT".

Note that, in this embodiment, an AV stream, which is obtained by multiplexing an image transport stream, a sound transport stream, a subtitle transport stream, and the like, and which is transmitted, will be referred to as "broadcast content". The term "broadcast content" does not mean an application or a section AIT.

The store server 800 provides the following service. The store server 800 provides an environment to a user of the information processing apparatus 700. In this environment, the user is capable of selecting or purchasing an other-than-broadcast-managed application that he wants to use. The store server 800 provides information to the user. This information is necessary to use the other-than-broadcast-managed application selected or purchased by the user. The "other-than-broadcast-managed application" is an application provided by a provider other than the manufacturer of broadcast resources. Examples of such a provider include a manufacturer of terminal devices, and an application provider such as a third party. A fundamental difference between the other-than-broadcast-managed application and the above-mentioned broadcast-managed application is as follows. A section AIT is delivered by a broadcast wave, and the section AIT manages the operation of the broadcast-managed application from start to end. To the contrary, an XML-AIT (Extensible Markup Language-Application Information Table) is obtained via a network, and the XML-AIT controls the operation of at least the startup and the like of the other-than-broadcast-managed application.

The store server 800 receives a request to use an arbitrary other-than-broadcast-managed application from a user. In response, the store server 800 delivers information, which is necessary to make the other-than-broadcast-managed application available, to the information processing apparatus 700 of the user. The "information which is necessary to make the other-than-broadcast-managed application available" is location information on the XML-AIT of the other-than-broadcast-managed application, for example.

The XML-AIT server 400 is connectable to the first network 200. In response to a request from the information processing apparatus 700, the XML-AIT server 400 delivers an XML-AIT via the first network 200. The XML-AIT includes information, which is used to control at least startup of the other-than-broadcast-managed application. Note that the section AIT may contain information used to control the operation of the running other-than-broadcast-managed application, which is started based on the XML-AIT.

The application server 300 is connectable to the first network 200. The application server 300 replies an other-than-broadcast-managed application in response to a request from the information processing apparatus 700. Further, the application server 300 may be capable of providing a broadcast-managed application.

Note that the store server 800, the application server 300, and the XML-AIT server 400 may be in one server. Each of the store server 800, the application server 300, and the XML-AIT server 400 includes a CPU, a main memory, a data storage device, a user interface, and the like and has a structure of a typical computer.

The edge router 500 is a router configured to connect the first network 200 and the second network 600. The second network 600 may be wired or wireless.

The specific product form of the information processing apparatus 700 is not limited. The information processing apparatus 700 is, for example, a personal computer, a mobile phone, a smartphone, a television receiver, a game machine, a tablet terminal, an audio/video player, or the like.

The information processing apparatus 700 receives a digital broadcast signal from the broadcast station 100. The information processing apparatus 700 demodulates the digital broadcast signal to thereby obtain a transport stream. The information processing apparatus 700 is configured to divide the transport stream to thereby obtain a broadcast stream. The information processing apparatus 700 is configured to decode the broadcast stream. The information processing apparatus 700 is configured to output the decoded broadcast stream to a display unit (not shown), a speaker unit (not shown), and a storage device (not shown), which are connected to the information processing apparatus 700.

Note that the information processing apparatus 700 may have a built-in display unit, a built-in speaker unit, and a built-in storage device. Alternatively, an independent display unit, an independent speaker unit, and an independent storage device may be connected to the information processing apparatus 700 directly or via the second network 600. Alternatively, an apparatus (not shown) including a display unit and a speaker unit may be connected to the information processing apparatus 700 directly or via the second network 600.

Further, the information processing apparatus 700 is capable of extracting PSI/SI, which includes a broadcast-managed application and an AIT section, from an obtained transport stream. The information processing apparatus 700 is further capable of interpreting the AIT section, and controlling the broadcast-managed application. If the broadcast-managed application is a visible application, the information processing apparatus 700 merges the image signal, which is generated when the broadcast-managed application is executed, the image signal of the above-mentioned broadcast content, and the subtitle signal. The information processing apparatus 700 outputs the merged signal to a display unit.

Further, the information processing apparatus 700 accesses the store server 800 in response to an instruction from a user. Then the information processing apparatus 700 can select or purchase an other-than-broadcast-managed application that the user wants to use. The information processing apparatus 700 accesses the store server 800 and selects or purchases an other-than-broadcast-managed application independent of the timing of a broadcast stream, that is, arbitrarily.

The information processing apparatus 700 selects or purchases an other-than-broadcast-managed application. The information processing apparatus 700 thus obtains location information on the XML-AIT of the other-than-broadcast-managed application from the store server 800. The location information on the XML-AIT is necessary to use the other-than-broadcast-managed application.

The information processing apparatus 700 accesses the XML-AIT server 400 based on the obtained location information on the XML-AIT. As a result, the information processing apparatus 700 can obtain the XML-AIT.

Further, the information processing apparatus 700 accesses the application server 300 via the network based on the location information on the other-than-broadcast-managed application, which is described in the obtained XML-AIT. As a result, the information processing apparatus 700 is capable of obtaining the other-than-broadcast-managed application, which is controlled based on the XML-AIT.

Further, the information processing apparatus 700 extracts the application identifier of the other-than-broadcast-managed application to be controlled from the obtained XML-AIT. The information processing apparatus 700 extracts a section AIT containing this application identifier from one or more section AITs, each of which is multiplexed with a received transport stream. The information processing apparatus 700 is further capable of controlling the operation of a running other-than-broadcast-managed application based on the section AIT.

Here, an other-than-broadcast-managed application will be explained supplementally.

Other-than-broadcast-managed applications roughly include packaged other-than-broadcast-managed applications and web-based other-than-broadcast-managed applications.

Figure 34:
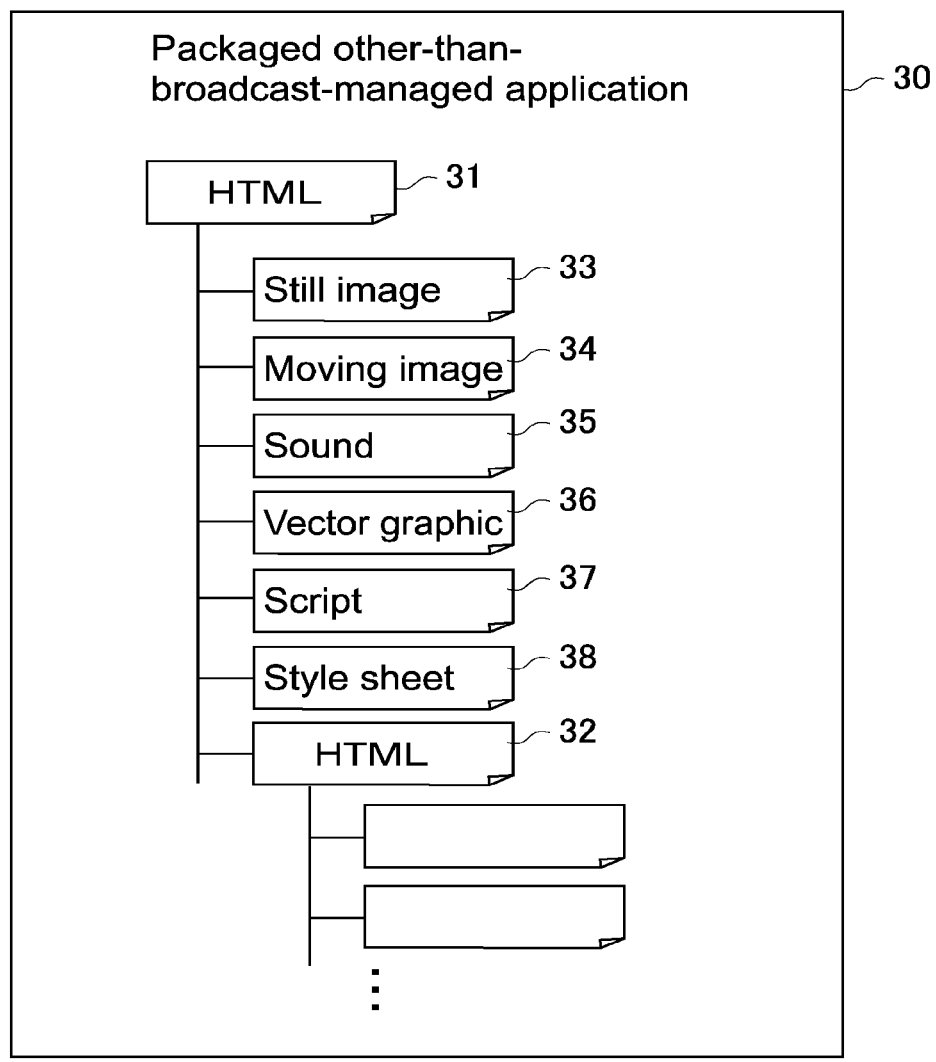
FIG. 34 A diagram illustrating a configuration of an other-than-broadcast-managed application (packaged).

FIG. 34 is a diagram illustrating the configuration of an other-than-broadcast-managed application (packaged).

An other-than-broadcast-managed application 30 contains, for example, markup texts 31 and 32, data files 33, 34, 35, and 36, a script file 37 such as a Java (registered trademark) script, style sheets 38 such as CSS (Cascading Style Sheets), and the like. The markup text 31 or 32 is an HTML (Hyper Text Markup Language) text, a BML (Broadcast Markup Language) text, an MHEG (Multimedia and Hypermedia information coding Experts Group) text, or the like. The data file 33, 34, 35, or 36 is in association with the markup text 31 or 32. For example, the data file 33, 34, 35, or 36 is a still image, a moving image, sound, a vector graphic, or the like.

The other-than-broadcast-managed application 30 contains one or more pages. The pages are linked to one another by hyperlinks. As a result, one other-than-broadcast-managed application 30 is structured as a whole.

In the packaged other-than-broadcast-managed application 30, all the resource files, which structure the other-than-broadcast-managed application 30, are packaged. The application server 300 stores this package. In response to a request to obtain a package from the information processing apparatus 700, the application server 300 sends this package to the information processing apparatus 700. The information processing apparatus 700 stores the obtained package. As a result, by the information processing apparatus 700 merely accessing each resource file of a package stored therein, the information processing apparatus 700 is capable of starting the other-than-broadcast-managed application 30.

To the contrary, the information processing apparatus 700 obtains necessary resource files of a web-based other-than-broadcast-managed application page by page, and starts the application. The information processing apparatus 700 does not store the resource files obtained page by page. The information processing apparatus 700 as necessary accesses the server and obtains necessary resource files page by page in order to start the other-than-broadcast-managed application.

Hereinafter, it is assumed that the information processing apparatus 700 obtains and uses a packaged other-than-broadcast-managed application. Description thereof will be made mainly.

An other-than-broadcast-managed application may be visible or invisible. A user is capable of watching operations of the visible other-than-broadcast-managed application on a screen. A user is not capable of watching operations of the invisible other-than-broadcast-managed application on a screen.

Further, an other-than-broadcast-managed application may be a bidirectional application or a unidirectional application. The bidirectional application is configured to change information and a function to be provided in response to an operation input in the information processing apparatus 700 by a user. The unidirectional application is configured to provide information to a user unidirectionally.

[Data structure of XML-AIT]

Next, the data structure of an XML-AIT will be described.

FIG. 2 is a diagram showing the data structure of an XML-AIT of this embodiment.

In the XML-AIT, an application name (appName), an application identifier (applicationId), an application descriptor (applicationDescriptor), a transport protocol descriptor (applicationTransport), an application location descriptor (applicationLocation), an application boundary descriptor (applicationBoundary), an application specific descriptor (applicationSpecificDescriptor), an application usage descriptor (applicationUsageDescriptor), a use-permission information descriptor 21 (broadcastResourcePermissionDescriptor), an expire date (expireDate) 22, a parent application ID (parentAppID) 23, an application hash descriptor (applicationHashDescriptor) 24, an application type descriptor (applicationTypeDescriptor) 25, and the like are stored for each other-than-broadcast-managed application.

The application descriptor stores an application type (applicationType), an application control code (controlCode) 26, a flag specifying visibility/invisibility of an application (visibility), a flag showing if an application is in association with a service (serviceBound), an application priority (priority), an application version (version), icon information (icon), information used by the information processing apparatus 700 to record or cache an application (storageCapability), and the like.

The use-permission information descriptor 21 is added if an other-than-broadcast-managed application is allowed to use a broadcast resource.

The expire date 22 is information specifying the expire date of an XML-AIT, which is cached by the information processing apparatus 700, when the information processing apparatus 700 is not connected to the network (offline).

The parent application ID 23 is the ID of the parent other-than-broadcast-managed application, whose expire date is in conjunction with the expire date of its child other-than-broadcast-managed application. Here, examples of the parent other-than-broadcast-managed application whose expire date is in conjunction with the expire date of its child other-than-broadcast-managed application" are as follows.

1. The expire date of the child other-than-broadcast-managed application is in synchronization with the expire date of the parent other-than-broadcast-managed application.
2. The expire date of the child other-than-broadcast-managed application is validated when the expire date of the parent other-than-broadcast-managed application is expired.
3. The expire date of the child other-than-broadcast-managed application is expired in synchronization with the expire date of the parent other-than-broadcast-managed application.

Note that in this example, it is assumed that the child other-than-broadcast-managed application is affected by the expire date of the parent other-than-broadcast-managed application. In other words, the parent other-than-broadcast-managed application is affected by the expire date of the child other-than-broadcast-managed application depending on the parent application ID of the XML-AIT of the parent other-than-broadcast-managed application.

FIG. 3 is a diagram showing the syntax of the use-permission information descriptor 21.

The use-permission information descriptor 21 may describe one or more pieces of service use-permission information (Service permission), and one or more pieces of overlay area information (Overlay area).

The service use-permission information includes a permission specifying unit (scope). The permission specifying unit (scope) shows the use-permission applicable scope. Examples of the permission specifying unit are as follows.

all: all broadcasters
  affiliate: affiliate
  broadcaster: broadcaster
  service: channel
  event: program
  series: series If the permission specifying unit is "affiliate", the affiliate is specified based on the affiliation ID (affiation_id).

If the permission specifying unit is "broadcaster", the broadcaster is specified based on the broadcaster ID (broadcaster_id).

If the permission specifying unit is "service", the channel is specified based on the network ID (network_Id), the transport stream ID (transport_stream_id), and the service ID (service_id).

If the permission specifying unit is "event", the program is specified by the network ID, the transport stream ID, the service ID, and the event ID (event_id).

If the permission specifying unit is "series", the series is specified by the network ID, the transport stream ID, the service ID, and the series ID (series_id).

The service use-permission information further stores a permission bitmap (permission). The permission bitmap is binary data of service use-permission information.

The memory of an application controller 708 stores the permission bitmap. The application controller 708 refers to the permission bitmap stored in the memory, and controls the scope of broadcast resources that the other-than-broadcast-managed application can use.

After the other-than-broadcast-managed application is started, the information processing apparatus 700 obtains the section AIT. The external application control descriptor of the section AIT describes a permission bitmap. The information processing apparatus 700 compares the permission bitmap stored in the external application control descriptor of the section AIT to the permission bitmap stored in the memory. If the permission bitmap stored in the external application control descriptor of the section AIT is different from the permission bitmap stored in the memory, the information processing apparatus 700 writes the permission bitmap stored in the external application control descriptor of the section AIT over the permission bitmap stored in the memory. Hereinafter, the application controller 708 refers to the overwritten permission bitmap, and controls the scope of broadcast resources that the other-than-broadcast-managed application can use.

As a result, for example, the following scheme is realized. The broadcast station side is capable of dynamically changing, by using the section AIT, the scope of the use-permission information set for an XML-AIT, which is created by a third party such as a provider of an other-than-broadcast-managed application.

The service use-permission information further describes information (Overlay_Permission_error_behaviour) on the behavior during a permission error. Examples of the "information on the behavior during a permission error" are as follows.

app_off: Hide the application.
  video_off: Hide the video of the broadcast resource.
  app_suspend: Hide the application, and suspend the operation of the application.

As described above, at least the video of the broadcast resource is hidden when a permission error occurs. Because of this, it is not possible to use the broadcast resource substantially.

Next, the overlay area information (Overlay_area) will be described.

The overlay area information defines an overlay area. The overlay area is in a display window, in which the other-than-broadcast-managed application can be displayed. In other words, the overlay area is mainly set such that the overlay area overlaps with an area, in which a broadcast image is displayed.

Examples of information defining the overlay area include an area ID (areaId), an ID of an element of an HTML application (elementId), an area upper-left horizontal coordinate (upper_left_horizontal), an area upper-left vertical coordinate (upper_left_vertical), an area horizontal size (horizontal_size), an area vertical size (vertical_size), and the like.

The area ID is an identifier identifying the overlay area.

The ID of an element of an HTML application is an identifier identifying an other-than-broadcast-managed application in association with the overlay area, or an identifier identifying an element of the other-than-broadcast-managed application.

The area upper-left horizontal coordinate or the area upper-left vertical coordinate is information specifying the coordinate of the upper-left corner of the overlay area.

The area vertical size or the area horizontal size is information specifying the vertical or horizontal length of the overlay area.

[Electronic Signature of XML-AIT]

An electronic signature for detecting falsification is attached to the XML-AIT. For example, an XML signature or the like may be used as an electronic signature. Any XML signature system such as a detached signature, an enveloping signature, or an enveloped signature, may be employed. The detached signature is independent of an XML-AIT. The enveloping signature includes an XML-AIT therein. The enveloped signature is included in an XML-AIT. Note that it is desirable to use the detached signature to limit influence on the XML-AIT format.

An application controller 708 of the information processing apparatus 700 validates the XML signature according to a core validation procedure. The core validation procedure includes reference validation and signature validation.

According to the reference validation, a canonicalization transformation process (Transform) and a digest calculation algorithm (Digest Method) are applied to a resource (XML-AIT) to thereby validate a digest value (DigestValue) of a reference (Reference). The result obtained by the reference validation is compared with a registered digest value (DigestValue). If they are different, the result is invalid.

According to the signature validation, a signature information (SignatureInfo) element is serialized based on a canonicalization system, which is determined in an XML canonicalization algorithm (Canonicalization Method). Key data is obtained by using key information (KeyInfo) and the like. The signature is validated by using a system, which is determined in the signature algorithm (SignatureMethod).

[Structure of section AIT]

FIG. 4 is a diagram showing the data structure of a section AIT.

The section AIT stores a table ID (table id), a section syntax indicator (section_syntax_indicator), a section length (section_length), an application type (application_type), a version number (version_number), a current next indicator (current_next_indicator), a section number (section_number), a last section number (last_section_number), a common descriptor area 41 (descriptor), an application information loop length (application_loop_length), an application identifier (application_identifier), an application control code 42 (application_control_code), an application descriptor (application_descriptor), and the like.

An external application control descriptor (External_application_control_descriptor) is stored in the common descriptor area 41. The external application control descriptor (External_application_control_descriptor) is used to control the operation of an other-than-broadcast-managed application.

[Syntax of External Application Control Descriptor]

FIG. 5 is a diagram showing the syntax of the external application control descriptor (External_application_control_descriptor).

The external application control descriptor describes a descriptor tag (descriptor_tag), a descriptor length (descriptor_length), a permission bitmap count (permission_bitmap_ count), a permission bitmap 58 (permission_bitmap), and the like.

The permission bitmap 58 described in the section AIT is binary data, which shows the scope of the permission of use of a broadcast resource by an other-than-broadcast-managed application run by the information processing apparatus 700. In other words, the permission bitmap 58 is binary data showing service use-permission information. The permission bitmap is compared to a permission bitmap stored in the memory of the application controller 708 of the information processing apparatus 700.

Note that the XML-AIT permission bitmap and the section AIT permission bitmap may include binary data showing information on the behavior if a permission error occurs. Note that in this embodiment, only the XML-AIT permission bitmap includes binary data showing information on the behavior if a permission error occurs.

The external application control descriptor describes information on the overlay area. Specifically, the external application control descriptor describes an overlay admission polarity (overlay_admission_polarity) and an overlay controlled area count (overlay_contolled_area_count).

The overlay admission polarity is information specifying that use of an overlay area, which is defined by the section AIT, is to be admitted or not.

The overlay controlled area count is information which specifies the number of overlay areas.

The external application control descriptor further describes information on an overlay area, i.e., an overlay area tag (overlay_controlled_area_tag), an area upper-left horizontal coordinate (upper_left_horizontal), an area upper-left vertical coordinate (upper_left_vertical), an area horizontal size (horizontal_size), an area vertical size (vertical_size), and the like.

The overlay area tag is tag information identifying an overlay area.

Information specified by each of the area upper-left horizontal coordinate, the area upper-left vertical coordinate, the area horizontal size, and the area vertical size is same as the use-permission information descriptor of the XML-AIT having the same name.

The external application control descriptor further describes a black/white application list count (bw_application_list_count), an application ID (application_identifier), a black/white polarity (black_white_polarity), and the like.

The black/white application list count is information specifying the number of applications, whose use of a broadcast resource is admitted or not.

The application ID is the application ID of an application, whose use of a broadcast resource is admitted or not.

The black/white polarity is information specifying that use of a broadcast resource is to be admitted or not. For example, even if the overlay admission polarity specifies the polarity that can use an overlay area, if the black/white polarity specifies that use of a broadcast resource by a particular other-than-broadcast-managed application is "not admitted", use of a broadcast resource by the particular other-than-broadcast-managed application is not admitted. Further, even if the overlay admission polarity specifies the polarity that cannot use an overlay area, if the black/white polarity specifies that use of a broadcast resource by a particular other-than-broadcast-managed application is "admitted", use of a broadcast resource by the particular other-than-broadcast-managed application is admitted.

[Definition of Application Control Code]

The information processing apparatus 700 dynamically controls the life cycle of an application based on the application control code 26 stored in the XML-AIT and based on the application control code 42 stored in the section AIT.

FIG. 6 is a diagram showing the definition of the application control codes 26 and 42.

As shown in FIG. 6, the application control codes 26 and 42 each include, under the standard, "AUTOSTART", "PRESENT", "DESTROY", "KILL", "PREFETCH", "REMOTE", "DISABLED", and "PLAYBACK AUTOSTART". The application control codes are defined as follows.

"AUTOSTART" is a code instructing to automatically start an application when a service is selected. This is not applied when an application is already executed.

"PRESENT" is a code instructing to make an application executable when a service is selected. Note that the target application is not started automatically when a service is selected. The target application is started when a start instruction from a user is received.

"DESTROY" is a code instructing to allow quit of an application.

"KILL" is a code instructing to terminate an application forcibly.

"PREFETCH" is a code instructing to cache an application.

"REMOTE" is a code indicating that an application cannot be obtained from the current transport stream. The application may be obtained from another transport stream or a cache to become usable.

"DISABLED" is a code showing that start of an application is restricted.

"PLAYBACK AUTOSTART" is a code for starting an application when broadcast content, which is recorded in a storage (storage device), is reproduced.

[Configuration of Information Processing Apparatus 700]

Figure 7:
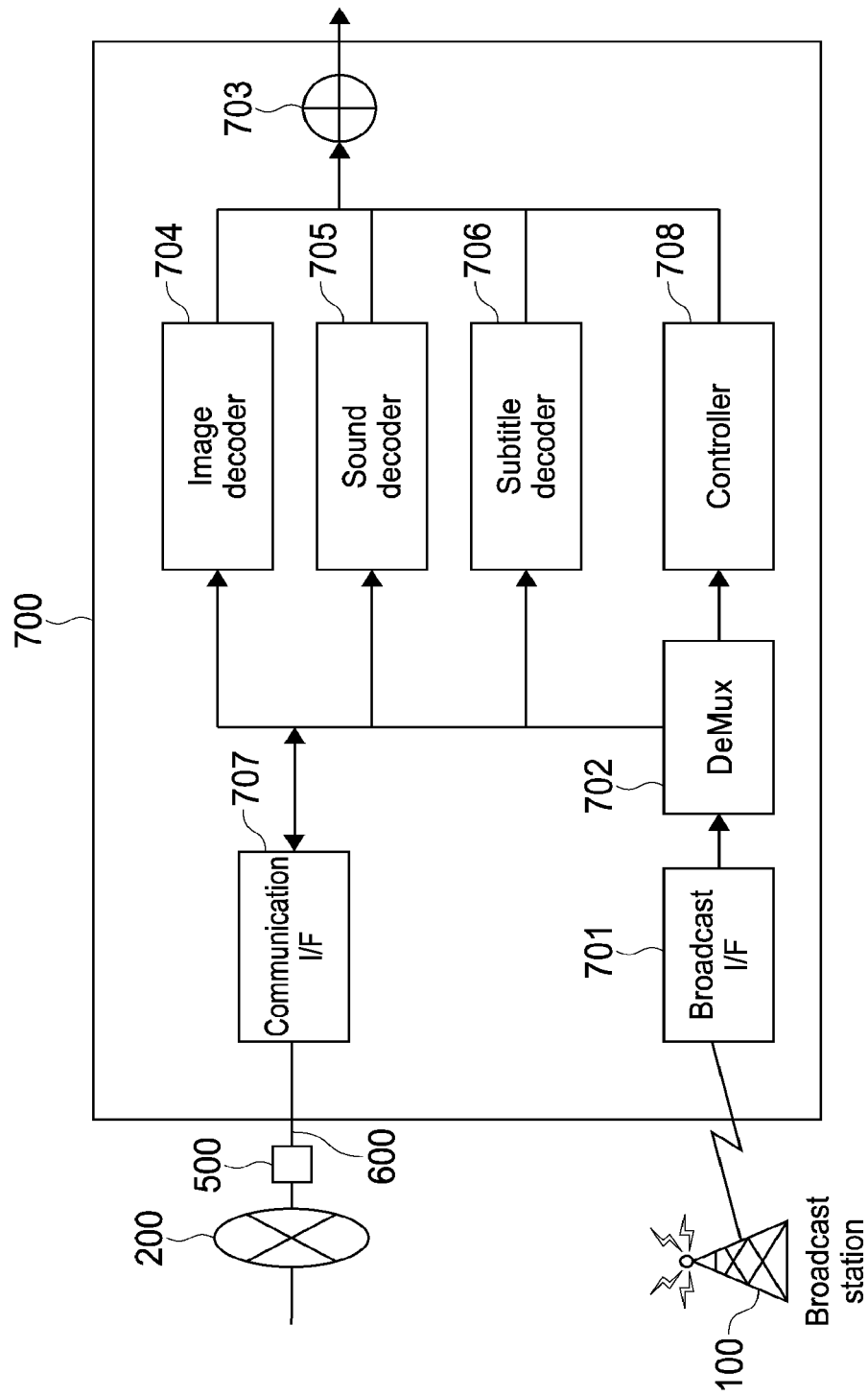
FIG. 7 A block diagram showing a structure of an information processing apparatus of this embodiment.

FIG. 7 is a block diagram showing the structure of the information processing apparatus 700 of this embodiment.

The information processing apparatus 700 includes a broadcast interface 701, a demultiplexer 702, an output processor 703, an image decoder 704, a sound decoder 705, a subtitle decoder 706, a communication interface 707, and the application controller 708 (controller).

The broadcast interface 701 (broadcast receiver) includes an antenna and a tuner. The broadcast interface 701 receives a digital broadcast signal selected by a user by using the antenna and the tuner. The broadcast interface 701, for example, demodulates the received digital broadcast signal, and outputs the obtained transport stream to the demultiplexer 702.

The demultiplexer 702 demultiplexes the transport stream to thereby obtain stream packets of broadcast content, packets of an application, and packets of an AIT section. The demultiplexer 702 demultiplexes the stream packets of the broadcast content to thereby obtain an image ES (Elementary Stream), a sound ES, and a subtitle ES. The demultiplexer 702 provides the image ES to the image decoder 704, provides the sound ES to the sound decoder 705, provides the subtitle ES to the subtitle decoder 706, and provides the packets of the application and packets of PSI/SI (Program Specific Information/Service Information) including the AIT section to the application controller 708.

The image decoder 704 decodes the image ES to thereby create an image signal. The image decoder 704 outputs the created image signal to the output processor 703. The sound decoder 705 decodes the sound ES to thereby create a sound signal. The sound decoder 705 outputs the created sound signal to the output processor 703.

The subtitle decoder 706 decodes the subtitle ES to thereby create a subtitle signal. The subtitle decoder 706 outputs the created subtitle signal to the output processor 703.

Each of the broadcast interface 701, the demultiplexer 702, the output processor 703, the image decoder 704, the sound decoder 705, and the subtitle decoder 706 is a broadcast content processor configured to receive and present broadcast content.

The communication interface 707 is configured to communicate with an external apparatus via the second network 600 such as a LAN. The communication interface 707 may communicate with an external apparatus via wireless or wired communication.

The application controller 708 (controller) is configured to control an application.

The output processor 703 merges the image signal from the image decoder 704, the sound signal from the sound decoder 705, the subtitle signal from the subtitle decoder 706, the image signal and the sound signal from the application controller 708, and the like. The output processor 703 outputs the merged signal to a storage device (not shown), a display unit (not shown), and a speaker unit (not shown), which are connected to the information processing apparatus 700.

A computer and a program provide part of or all of the configuration of the information processing apparatus 700 at least including the application controller 708. The computer includes a CPU (Central Processing Unit) and a memory. The program causes the computer to function as the application controller 708 and the like.

[Operation of Information Processing System 10]

Next, the operation of the information processing system 10 of this embodiment will be described.

The operation will be described in the following order.
1. To obtain an other-than-broadcast-managed application
2. To control the use-permission scope of a broadcast resource (first example)
3. To control the use-permission scope of a broadcast resource (second example)
4. To control an overlay area
5. To generate and verify an electronic signature
6. To manage the expire date of the XML-AIT
7. To control based on an application type (1. To Obtain an Other-Than-Broadcast-Managed Application)

Figure 8:
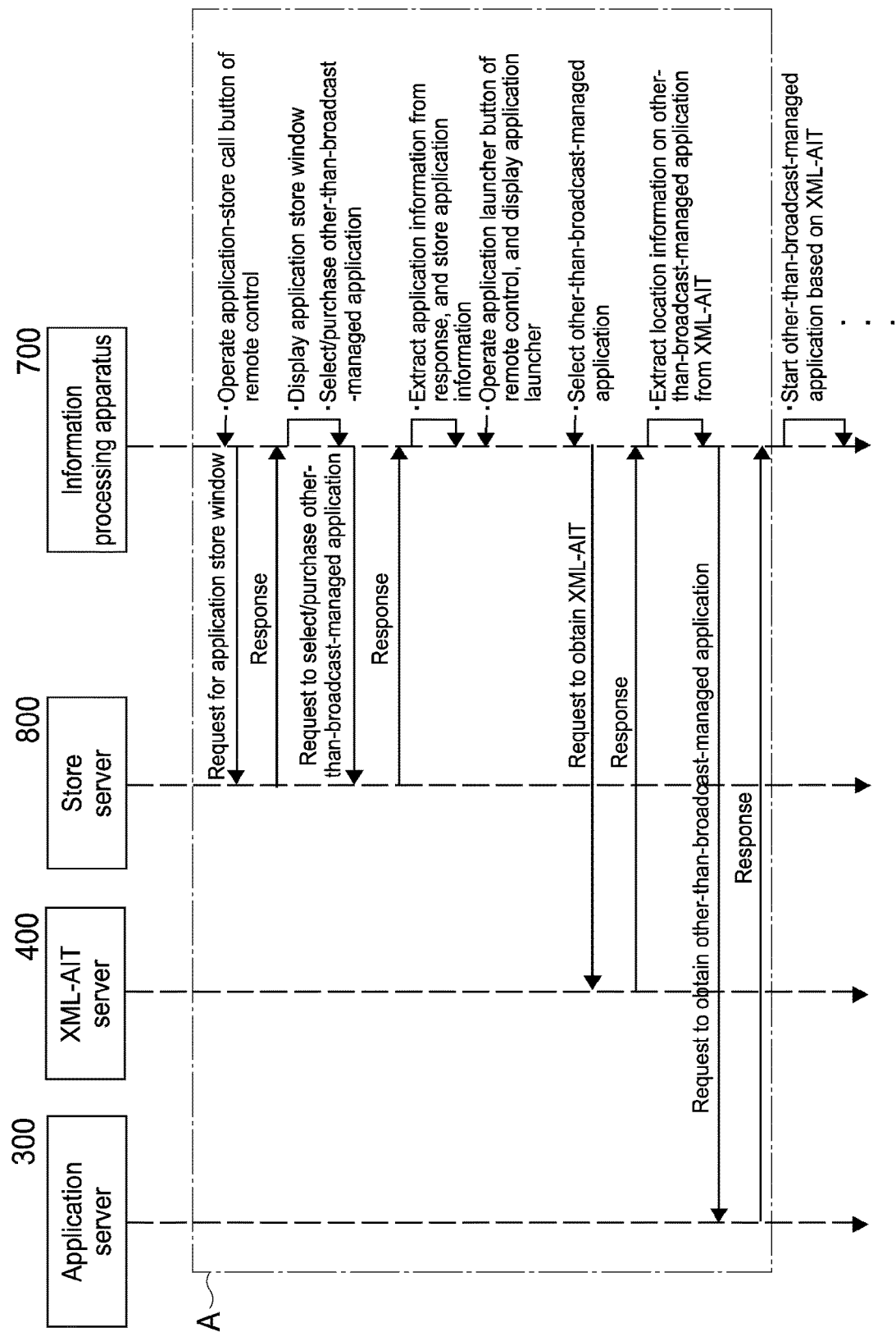
FIG. 8 A sequence diagram showing a flow of communication between an application server, an XML-AIT server, the information processing apparatus, and a store server from when a user operates an application-store call button of a remote controller of the information processing apparatus until the information processing apparatus starts the other-than-broadcast-managed application selected by the user.

FIG. 8 is a sequence diagram showing the flow of communication between the application server 300, the XML-AIT server 400, the information processing apparatus 700, and the store server 800 from when a user operates an application-store call button of a remote controller of the information processing apparatus 700 until the information processing apparatus 700 starts the other-than-broadcast-managed application selected by the user.

For example, the remote controller of the information processing apparatus 700 includes a predetermined application-store call button. Location information (URL, etc.) on an application store managed by the application server 300 is previously associated with the application-store call button. A user operates the application-store call button of the remote controller. Then the application controller 708 of the information processing apparatus 700 accesses the store server 800 based on the location information in association with the application store button. As a result, the application controller 708 obtains an application store window, and displays the application store window on the display unit of the information processing apparatus 700.

The application store window displays one or more other-than-broadcast-managed applications in addition to various kinds of information such as a description of the function and the conditions of use. The user is capable of selecting a desired other-than-broadcast-managed application on the application store window. After that, for example, if the other-than-broadcast-managed application is a paid application, the user purchases the application and follows accompanying procedures, for example. Note that it goes without saying that if the other-than-broadcast-managed application is free of charge, it is not necessary for the user to purchase the application and to follows accompanying procedures.

The store server 800 replies application information to the information processing apparatus 700 of the user such that the information processing apparatus 700 is capable of using the other-than-broadcast-managed application. The application information includes the name of the other-than-broadcast-managed application, icon information (bitmap image), and location information indicating the location of the XML-AIT for controlling the operation of the other-than-broadcast-managed application, such as a URL.

The application controller 708 of the information processing apparatus 700 stores application information replied from the store server 800.

Note that, subsequently, the application controller 708 of the information processing apparatus 700 may select another other-than-broadcast-managed application on the application store window, and obtain and store application information on the other other-than-broadcast-managed application replied from the store server 800.

Figure 9:
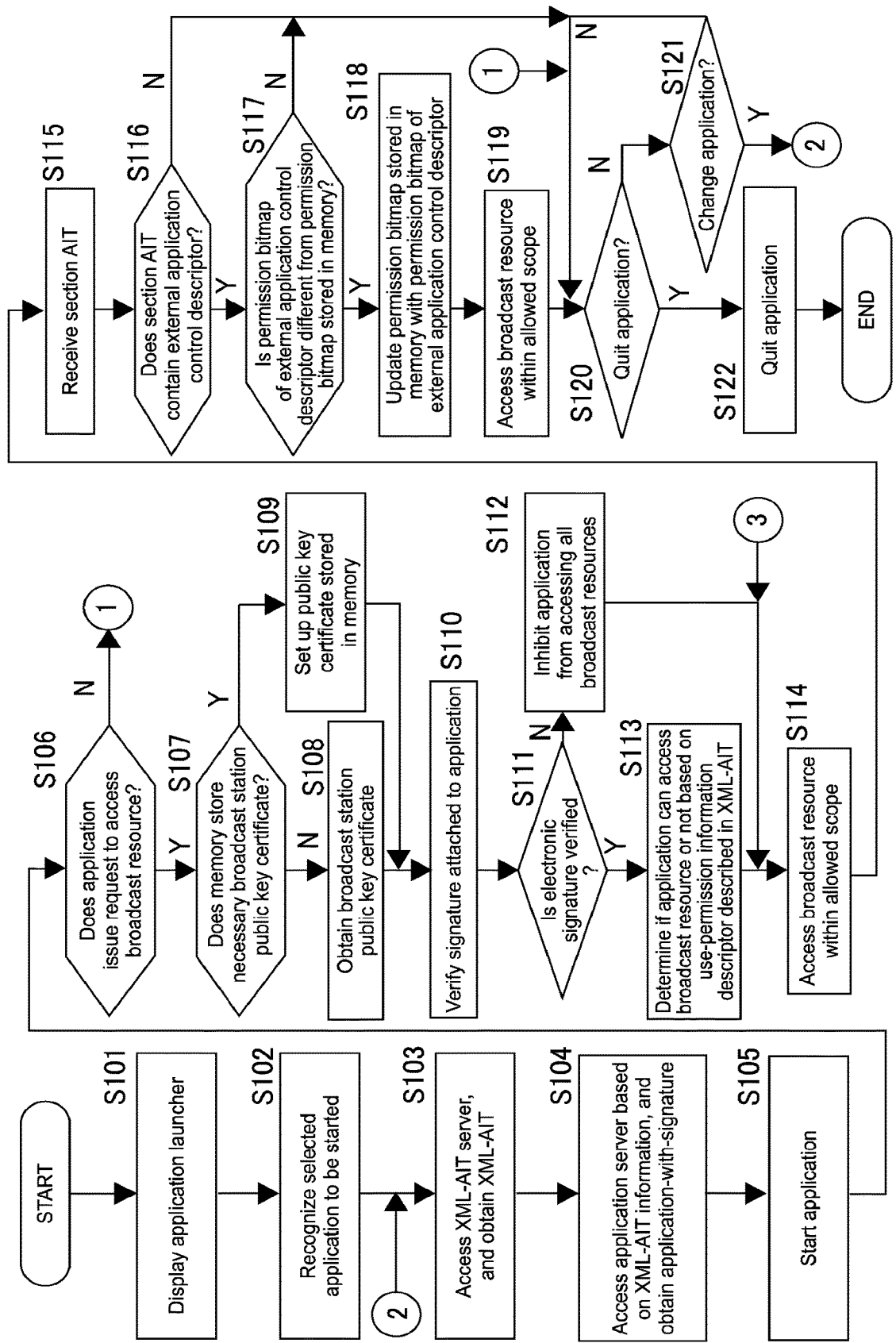
FIG. 9 A flowchart showing a procedure performed by the application controller of the information processing apparatus.

FIG. 9 is a flowchart showing the procedure performed by the application controller 708 of the information processing apparatus 700 after an application launcher is displayed.

Figure 10:
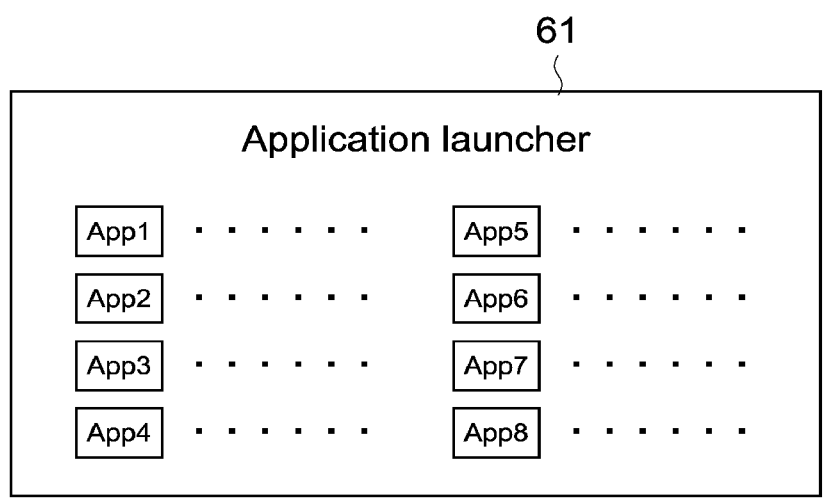
FIG. 10 A diagram showing an example of an application launcher.

The remote controller of the information processing apparatus 700 has another predetermined button, i.e., an application launcher button used to display an application launcher. The user of the information processing apparatus 700 operates the application launcher button. Then the application controller 708 generates an application launcher 61 as shown in FIG. 10 based on pieces of stored application information. The application controller 708 displays the application launcher 61 on the display unit of the information processing apparatus 700 (FIG. 9, Step S101).

FIG. 10 is a diagram showing an example of the application launcher.

As shown in FIG. 10, the application launcher 61 is a menu window showing selectable other-than-broadcast-managed applications. Here, App1 to App8 are icons, which are used to select other-than-broadcast-managed applications. The name, the function caption, and the like of the other-than-broadcast-managed application are displayed near each icon. Each of the icons App1 to App8 for selection is in association with location information indicating the location of the XML-AIT for controlling the operation of the corresponding other-than-broadcast-managed application, such as a URL.

The user selects the icon of the other-than-broadcast-managed application to be started on the displayed application launcher 61. Then the application controller 708 recognizes the selected other-than-broadcast-managed application (FIG. 9, Step S102).

The application controller 708 of the information processing apparatus 700 generates a request to obtain the XML-AIT, which controls the operation of the above-mentioned other-than-broadcast-managed application selected by the user, based on the location information in association with the icon on the application launcher 61, which is selected by the user. The application controller 708 sends the request to obtain the XML-AIT to the XML-AIT server 400. The XML-AIT server 400 receives the request to obtain the XML-AIT from the information processing apparatus 700. Then the XML-AIT server 400 sends a reply, which includes the corresponding XML-AIT, to the information processing apparatus 700 (FIG. 9, Step S103). In this manner the information processing apparatus 700 is capable of obtaining the XML-AIT, which controls the operation of the other-than-broadcast-managed application selected by the user.

Subsequently the application controller 708 of the information processing apparatus 700 accesses the application server 300 based on the location information on the application described in the obtained XML-AIT. As a result, the application controller 708 obtains the other-than-broadcast-managed application (FIG. 9, Step S104).

Here, it is assumed that the obtained other-than-broadcast-managed application is a packaged application. A packaged application is executed as follows. All the information (HTML5, script, image, etc.) necessary to execute the application is stored (installed) in the information processing apparatus 700 and executed.

After obtaining the other-than-broadcast-managed application, the application controller 708 starts the obtained other-than-broadcast-managed application based on the application control code "AUTOSTART" described in the XML-AIT (FIG. 9, Step S105).

The operation from when a user operates an application-store call button of a remote controller of the information processing apparatus 700 until the information processing apparatus 700 starts the other-than-broadcast-managed application selected by the user has been described above.

(2. To Control the Use-Permission Scope of a Broadcast Resource (First Example))

Figure 11:
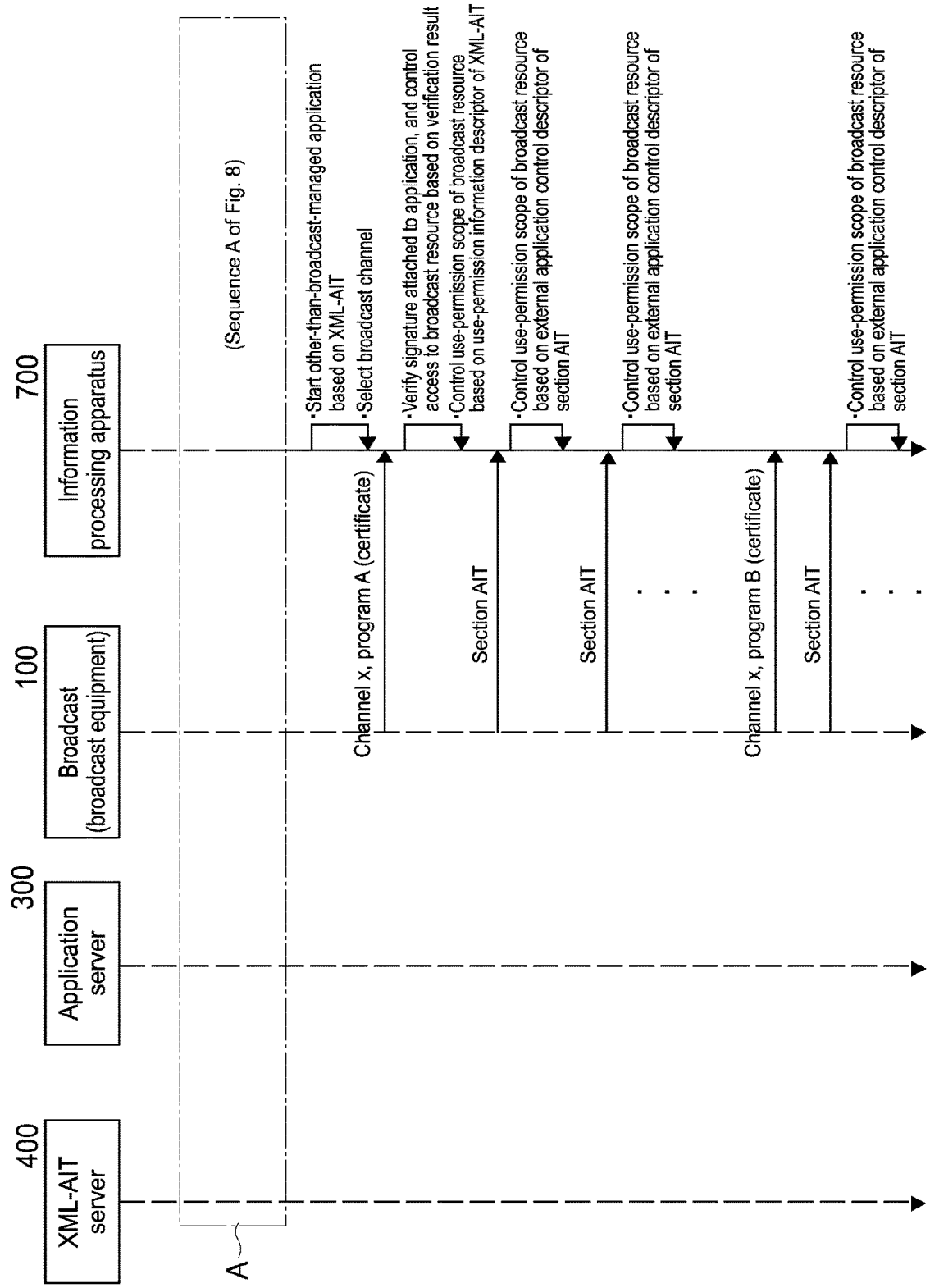
FIG. 11 A sequence diagram showing how to control a use-permission scope of a broadcast resource after the other-than-broadcast-managed application is started, and showing a flow of communication between the broadcast station, the application server, the XML-AIT server, and the information processing apparatus.

FIG. 11 is a sequence diagram showing how to control the use-permission scope of a broadcast resource after the other-than-broadcast-managed application is started, and showing the flow of communication between the broadcast station 100, the application server 300, the XML-AIT server 400, and the information processing apparatus 700.

The application controller 708 starts the other-than-broadcast-managed application. After that, the application controller 708 monitors if the other-than-broadcast-managed application has issued a request to access a broadcast resource (FIG. 9, Step S106). If the application controller 708 detects a request to access a broadcast resource from the other-than-broadcast-managed application (FIG. 9, Step S106, Y), the application controller 708 checks if a broadcast station public key certificate corresponding to the broadcast resource is stored in the memory of the information processing apparatus 700 (FIG. 9, Step S107).

If the broadcast station public key certificate is not stored in the memory of the information processing apparatus 700 (FIG. 9, Step S107, N), the application controller 708 of the information processing apparatus 700 waits for the desired broadcast station public key certificate to be transmitted in a data carousel. The application controller 708 receives the desired broadcast station public key certificate, and then stores the desired broadcast station public key certificate in the memory (FIG. 9, Step S108).

The application controller 708 verifies the electronic signature, which is attached to the running other-than-broadcast-managed application, by using the broadcast station public key certificate stored in the memory (FIG. 9, Step S110). If the application controller 708 fails to verify the electronic signature (FIG. 9, Step S111, N), the application controller 708 determines that the broadcast station has not authenticated the other-than-broadcast-managed application. The application controller 708 inhibits the other-than-broadcast-managed application from accessing all the broadcast resources from the broadcast station (FIG. 9, Step S112). When the application controller 708 inhibits the other-than-broadcast-managed application from accessing the broadcast resources, even if the other-than-broadcast-managed application is started, the other-than-broadcast-managed application is not capable of accessing the broadcast resources.

If the application controller 708 verifies the electronic signature successfully (Step S111, Y), the application controller 708 determines if the other-than-broadcast-managed application can access the broadcast resource of the access request or not based on the service use-permission information on the use-permission information descriptor 21 described in the XML-AIT (FIG. 9, Step S113).

Note that the memory of the application controller 708 stores the service use-permission information on the use-permission information descriptor 21 described in the XML-AIT in the form of a permission bitmap (binary data). The application controller 708 refers to the permission bitmap, and determines if the other-than-broadcast-managed application can access the requested broadcast resource or not.

Here, for example, it is assumed that the permission specifying unit of the service use-permission information is "service". In this case, the service use-permission information on the use-permission information descriptor 21 specifies the information identifying a channel based on the network ID, the transport stream ID, and the service ID. Here, the channel will be referred to as "channel x". In this example, if the other-than-broadcast-managed application requests to access the "channel x", the application controller 708 allows the access request, and allows the other-than-broadcast-managed application to access the "channel x".

If the other-than-broadcast-managed application requests to access another channel, the application controller 708 determines that a permission error has occurred. In this case, the application controller 708 controls the operation of the other-than-broadcast-managed application based on information on the behavior during a permission error, which is stored in the service use-permission information on the use-permission information descriptor 21.

As described above, if the application controller 708 verifies the electronic signature successfully, the application controller 708 controls the other-than-broadcast-managed application to access a broadcast resource within an allowed scope based on the service use-permission information on the XML-AIT (FIG. 9, Step S114).

Meanwhile, the broadcast station 100 periodically sends the section AIT, which is used to control the operation of the running other-than-broadcast-managed application executed by the information processing apparatus 700. The cycle of sending the section AIT is, for example, about 100 ms. A version number manages the generation of the section AIT. The application controller 708 stores the version number of the section AIT obtained most recently. The application controller 708 receives a section AIT, whose version number is different from the stored version number (FIG. 9, Step S115).

The application controller 708 confirms if the received section AIT contains an external application control descriptor or not (FIG. 9, Step S116). If the received section AIT does not contain an external application control descriptor (FIG. 9, Step S116, N), use of a broadcast resource is continuously permitted based on the use-permission information descriptor 21 (permission bitmap stored in memory) stored in the XML-AIT.

If the obtained section AIT contains an external application control descriptor (FIG. 9, Step S116, Y), the application controller 708 compares the permission bitmap of this external application control descriptor to the permission bitmap stored in the memory (FIG. 9, Step S117). If the permission bitmap of the external application control descriptor is different from the permission bitmap stored in the memory (FIG. 9, Step S117, Y), the application controller 708 updates the permission bitmap stored in the memory with the permission bitmap of the external application control descriptor (FIG. 9, Step S118). As a result, the information processing apparatus 700 sets up the use-permission scope of a broadcast resource, which the broadcast station side desires.

Note that if the permission bitmap of the external application control descriptor is the same as the permission bitmap stored in the memory (FIG. 9, Step S117, N), the permission bitmap stored in the memory is not updated, and use of a broadcast resource is continuously permitted based on this permission bitmap.

After that, for example, if the user operates a remote controller to input an instruction to quit the application, an instruction to select another application, or the like (FIG. 9, Step S120, Y), the application controller 708 of the information processing apparatus 700 quits the other-than-broadcast-managed application (FIG. 9, Step S122).

Further, if the application controller 708 of the information processing apparatus 700 obtains a section AIT when the other-than-broadcast-managed application is running and the section AIT describes an application control code other than "AUTOSTART", "DESTROY", and "KILL", the application controller 708 performs processing of changing the status of the other-than-broadcast-managed application based on the application control code, and the like (FIG. 9, Step S121), and waits for the next section AIT.

The application controller 708 performs the similar process every time it receives a section AIT after that.

After that, also when a program (program A) of one channel (channel x) is changed to another program (program B) of the same channel, the application controller 708 obtains a section AIT after the program A is changed to the program B and performs the similar process every time it receives a section AIT.

Further, also when a channel is changed to another channel, the application controller 708 obtains a section AIT after a channel is changed to another channel and performs the similar process every time it receives a section AIT.

(3. To Control the Use-Permission Scope of a Broadcast Resource (Second Example))

When an other-than-broadcast-managed application is running, for example, a user may perform a manual operation or the like to change a broadcast channel (direct channel-selection operation).

Figure 12:
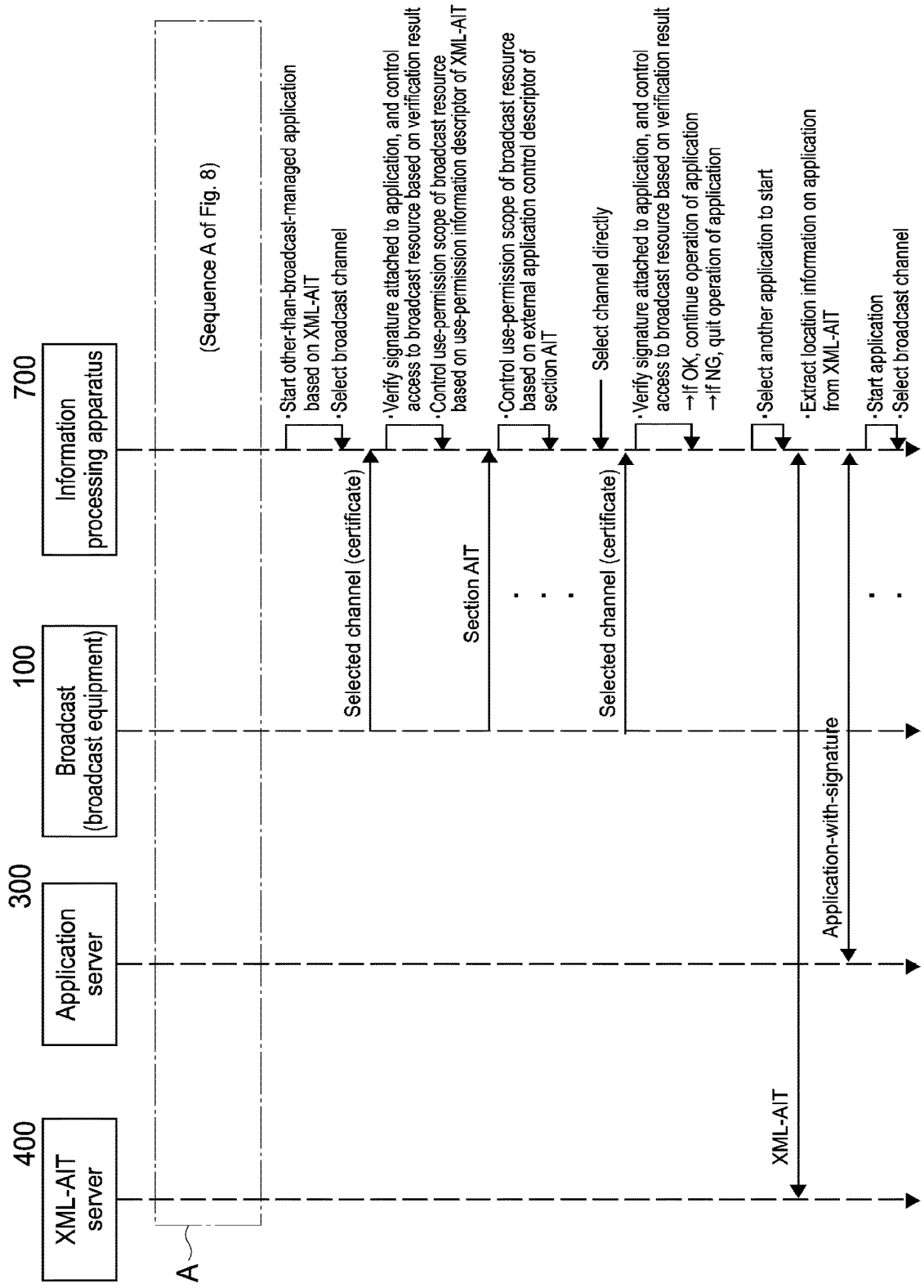
FIG. 12 A sequence diagram showing a flow of communication between the broadcast station, the application server, the XML-AIT server, and the information processing apparatus in a case where a direct channel-selection operation is generated when an other-than-broadcast-managed application is running.
Figure 13:
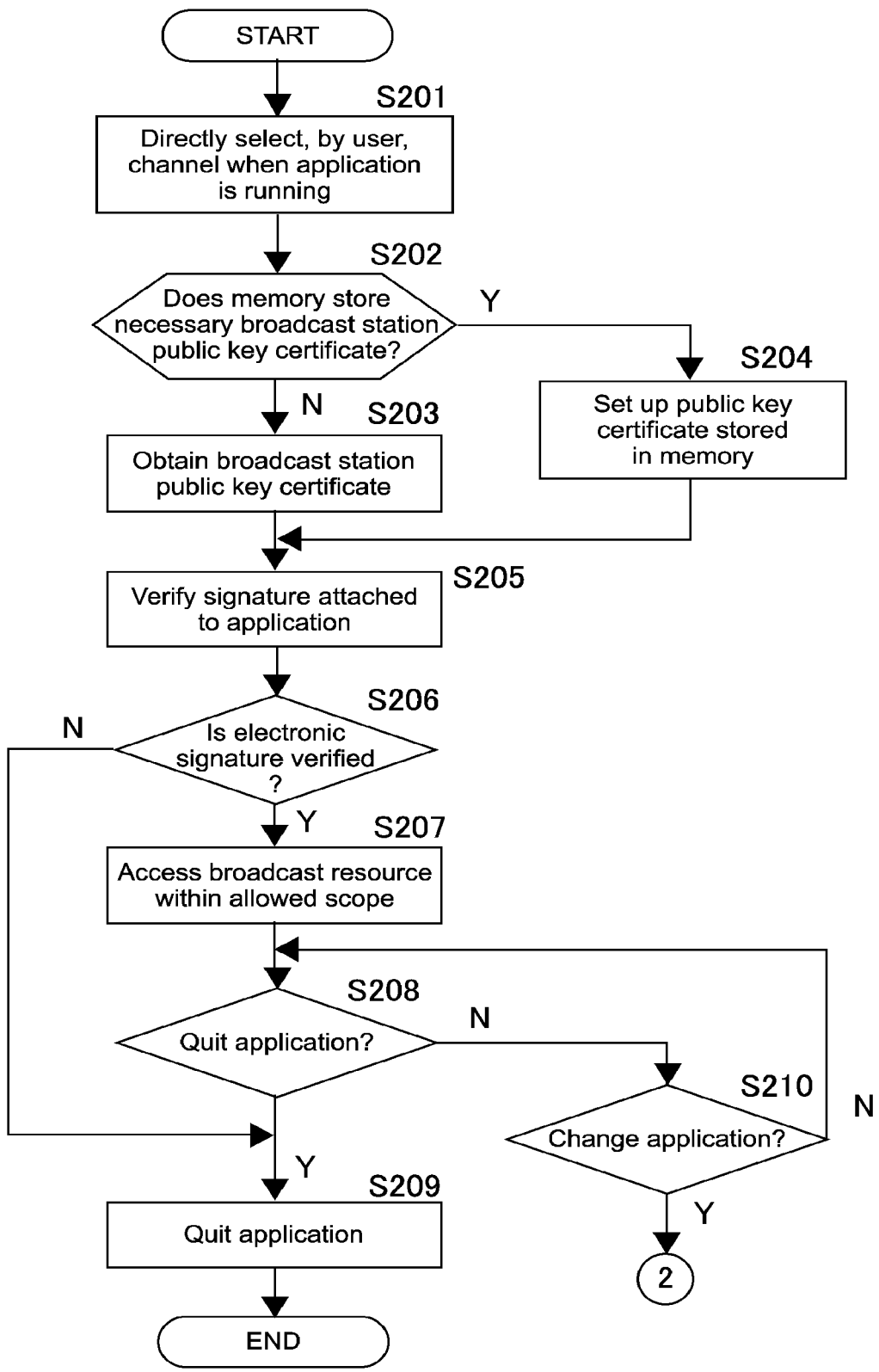
FIG. 13 A flowchart showing a flow of control by the application controller in a case where a direct channel-selection operation is generated when an other-than-broadcast-managed application is running.

FIG. 12 is a sequence diagram showing the flow of communication between the broadcast station 100, the application server 300, the XML-AIT server 400, and the information processing apparatus 700 in a case where a direct channel-selection operation is generated when an other-than-broadcast-managed application is running. FIG. 13 is a flowchart showing the flow of the control by the application controller 708 in a case where a direct channel-selection operation is generated when an other-than-broadcast-managed application is running.

If a direct channel-selection operation is generated when an other-than-broadcast-managed application is running (FIG. 13, Step S201), the application controller 708 of the information processing apparatus 700 checks if the memory of the information processing apparatus 700 stores a broadcast station public key certificate, which corresponds to the directly-selected broadcast channel (FIG. 13, Step S202).

If the memory of the information processing apparatus 700 is not storing a broadcast station public key certificate, the application controller 708 of the information processing apparatus 700 waits for a desired broadcast station public key certificate to be transmitted in a data carousel or the like of the broadcast channel after the change. When the application controller 708 receives a desired broadcast station public key certificate transmitted in a data carousel or the like, the application controller 708 stores the desired broadcast station public key certificate in the memory (FIG. 13, Step S203).

Note that in this case, a broadcast station public key certificate is transmitted in a data carousel, for example. Alternatively, the application controller 708 may obtain a public key certificate from a predetermined server via communication.

The application controller 708 verifies the electronic signature attached to the running other-than-broadcast-managed application by using a broadcast station public key certificate stored in the memory (FIG. 13, Step S205). If the application controller 708 fails to verify the electronic signature (FIG. 13, Step S206, N), the application controller 708 quits the other-than-broadcast-managed application (FIG. 13, Step S209).

If the application controller 708 verifies the electronic signature successfully (FIG. 13, Step S206, Y), the application controller 708 controls the other-than-broadcast-managed application to access a broadcast resource within the scope allowed based on the permission bitmap (FIG. 13, Step S207).

The operation thereafter is the same as the operation of Step S120 and the following steps of FIG. 9.

Further, as shown in FIG. 13, while the other-than-broadcast-managed application is running, for example, an instruction to change to another other-than-broadcast-managed application may be generated by execution of a script embedded in the other-than-broadcast-managed application, a manual operation made by the user, or the like. In this case, the application controller 708 behaves similar to the case where a user selects an other-than-broadcast-managed application by using the above-mentioned application launcher.

(4. To Control an Overlay Area)

As described above, an XML-AIT and a section AIT may describe overlay area information (Overlay area). The overlay area information (Overlay area) defines an overlay area, i.e., an area on a display window D, in which an other-than-broadcast-managed application can be displayed.

Figure 14:
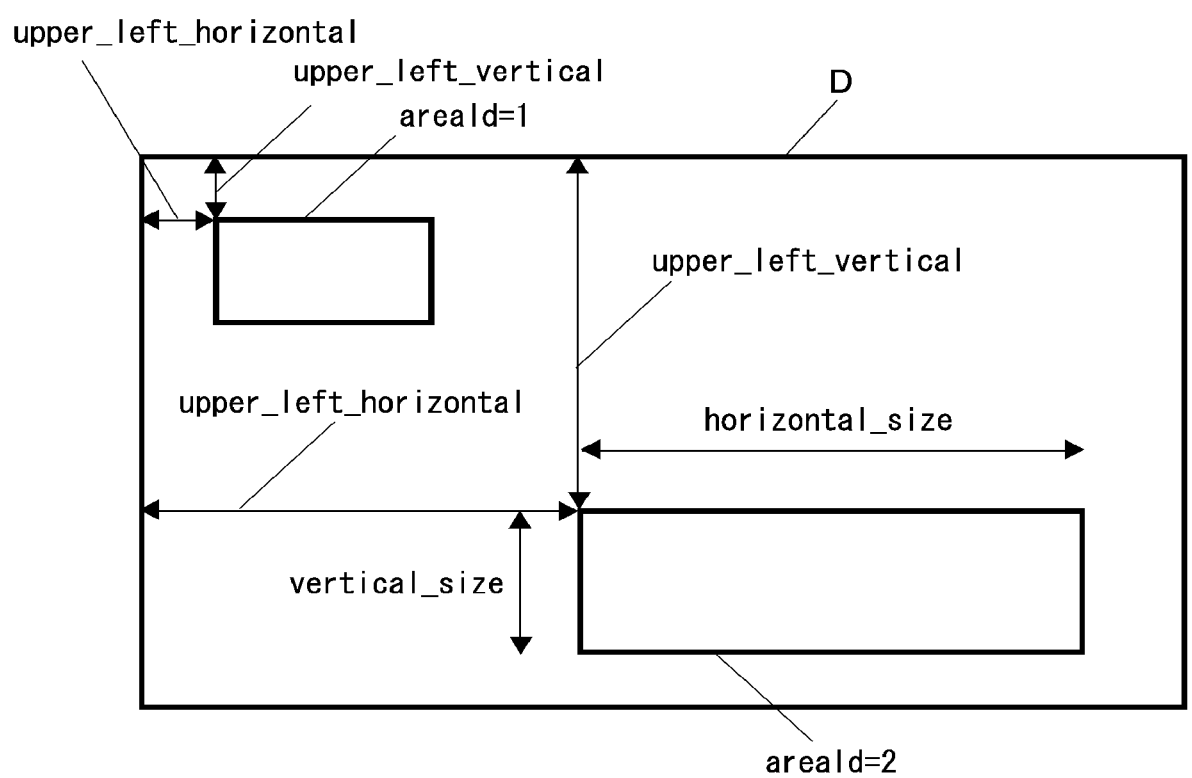
FIG. 14 A diagram showing an example of a configuration of an overlay area based on overlay area information on a use-permission information descriptor 21 of the XML-AIT.

FIG. 14 is a diagram showing an example of the configuration of an overlay area based on overlay area information on the use-permission information descriptor 21 of the XML-AIT.

In this configuration example, there are two overlay areas, i.e., areaId=1 and areaId=2. The area on the display window D of each overlay area is defined based on an area upper-left horizontal coordinate (upper_left_horizontal), an area upper-left vertical coordinate (upper_left_vertical), an area horizontal size (horizontal_size), and an area vertical size (vertical_size).

The application controller 708 creates each overlay area based on overlay area information (Overlay_area) on the use-permission information descriptor 21 of the XML-AIT.

The application controller 708 obtains a section AIT after the other-than-broadcast-managed application is started. Based on the information on an overlay area included in the external application control descriptor (External_application_control_descriptor) of the common descriptor area 41 (descriptor) of the section AIT, the application controller 708 is capable of creating a new overlay area. In other words, the application controller 708 is capable of updating the overlay area to an overlay area that the broadcast station 100 desires.

FIG. 15 is a diagram showing a first example of updating an overlay area.

In this example, an overlay area 1 is created based on overlay area information (Overlay_area) on the use-permission information descriptor 21 of the XML-AIT. Further, the overlay area 1 contains a display area 2 for an other-than-broadcast-managed application.

For example, after the channel is changed or the like, the application controller 708 creates a new overlay area 3 in place of the existing overlay area 1 based on information on an overlay area contained in the external application control descriptor of the received section AIT.

If the overlay area 1 is changed to the overlay area 3, the application controller 708 executes an embedded program, and thus displays the display area 2 for an other-than-broadcast-managed application in the newly-created overlay area 3.

Note that the application controller 708 controls the position of the display area 2 for an other-than-broadcast-managed application. For example, the application controller 708 displays the display area 2 for an other-than-broadcast-managed application at a predetermined position. If a plurality of display areas 2 for other-than-broadcast-managed applications are displayed simultaneously, the application controller 708 controls the positions of the plurality of display areas 2 exclusively.

FIG. 16 is a diagram showing a second example of updating an overlay area.

In this example, if the existing overlay area 1 is changed to the overlay area 3 based on information on an overlay area described in the external application control descriptor of the section AIT, the application controller 708 executes a previously-embedded program, and thus behaves as follows.

For example, the whole area of the display window D is used as a broadcast image display area 4. Firstly, the application controller 708 downsizes the broadcast image display area 4. As a result, a blank area is generated. The application controller 708 sets the blank area as an application display area 5. The application controller 708 displays the display area 2 for an other-than-broadcast-managed application in the application display area 5 irrespective of information on an overlay area of the external application control descriptor.

As a result, an other-than-broadcast-managed application is not displayed on the image of the broadcast image display area 4.

FIG. 17 is a diagram showing a third example of updating an overlay area.

In this example, a case where the overlay area 1 that uses the full screen of the display window D is set based on overlay area information on the XML-AIT will be discussed. The display area 2 for an other-than-broadcast-managed application is allocated to the whole overlay area 1, and the broadcast image display area 4 is set in a part thereof.

The application controller 708 creates a new overlay area 3 in place of the existing overlay area 1 based on the information on an overlay area included in the external application control descriptor of the section AIT received after changing the channel, for example.

At this time, the application controller 708 executes a previously-embedded program, thus sets up the broadcast image display area 4 as the full screen of the display window D, and hides the display area 2 for an other-than-broadcast-managed application. As a result, the other-than-broadcast-managed application does not partially hide the image in the broadcast image display area 4. Further, in the third example of update, if a child element (identified by elementId), which configures an other-than-broadcast-managed application, is designated as the positon of the overlay area 3, the child element may be displayed.

(5. To Generate and Verify an Electronic Signature)

Next, how to generate and verify an electronic signature will be described.

Figure 18:
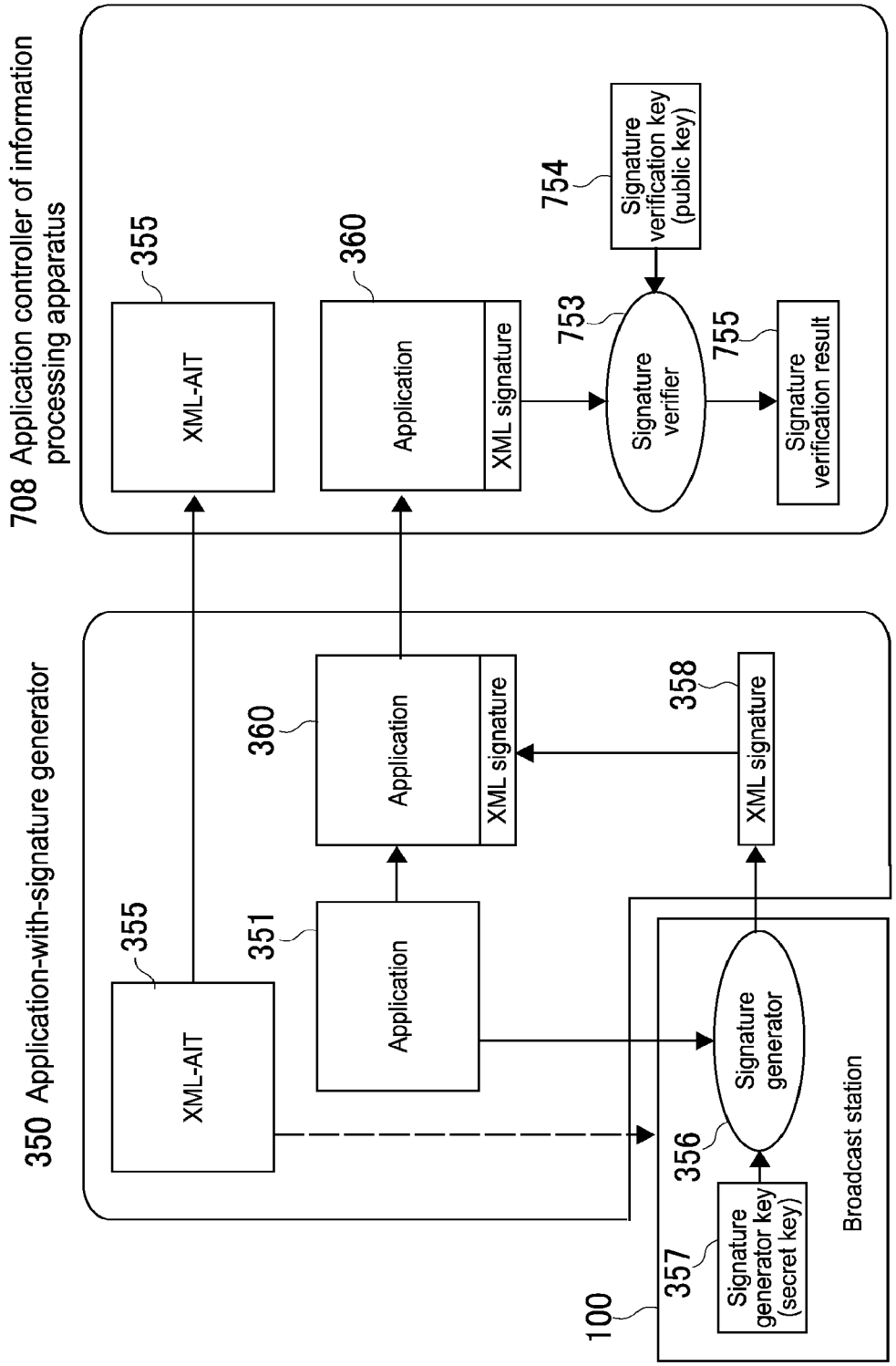
FIG. 18 A block diagram illustrating a scheme of generating and verifying an electronic signature.

FIG. 18 is a block diagram illustrating the scheme of generating and verifying an electronic signature.

One server that an application creator owns may provide the XML-AIT server 400 and the application server 300. Alternatively, the XML-AIT server 400 may be independent of the application server 300. Here, the XML-AIT server 400 and the application server 300 are inclusively referred to as a "server". The server is an apparatus having the configuration of a typical computer. In other words, the server includes a CPU, a main memory, a storage device such as an HDD, input devices such as a mouse and a keyboard, a display unit such as a liquid crystal display, and the like. The main memory and the storage device store software such as an OS (Operating System), application programs for the server, other-than-broadcast-managed applications provided to the information processing apparatus 700, XML-AIT files for the applications, a signature generator key, and the like.

The server includes an application-with-signature generator 350. Specifically a program loaded into the main memory and a CPU executing the program realize the application-with-signature generator 350.

An application creator requests the broadcast station 100 to authenticate an other-than-broadcast-managed application 351 and an XML-AIT 355.

The broadcast station 100 examines the content of the other-than-broadcast-managed application 351 and the content of the XML-AIT 355, which the application creator requested to authenticate. If there is no problem, the broadcast station 100 selects, as a signature generator key 357, a secret key out of a pair of the secret key issued by a root CA 900 (FIG. 1) and a broadcast station public key certificate. The broadcast station 100 provides the secret key to a signature generator 356. The signature generator 356 generates the digest of the other-than-broadcast-managed application 351 by using a hash function for a signature, encodes the digest by using a signature generator key (secret key) 357, and generates an XML signature 358. The broadcast station 100 replies the generated XML signature 358 to the server. The application-with-signature generator 350 adds the XML signature 358 replied from the broadcast station 100 to the other-than-broadcast-managed application 351, generates an application-with-electronic-signature 360, and delivers the application-with-electronic-signature 360 to the information processing apparatus 700.

A signature verifier 753 extracts an XML signature from the application-with-electronic-signature 360 obtained from the server. The application controller 708 of the information processing apparatus 700 verifies the XML signature by using a public key 754. The public key 754 is a signature verification key, which is retrieved from a broadcast station public key certificate. As a result, the application controller 708 obtains a signature verification result 755.

Next, a method of transmitting a broadcast station public key certificate from the broadcast station 100 to the information processing apparatus 700 will be described.

Examples of the method of transmitting a broadcast station public key certificate from the broadcast station 100 to the information processing apparatus 700 include a dedicated module method, a data broadcast extension method (first example), a data broadcast extension method (second example), and the like.

(Dedicated Module Method)

Figure 19:
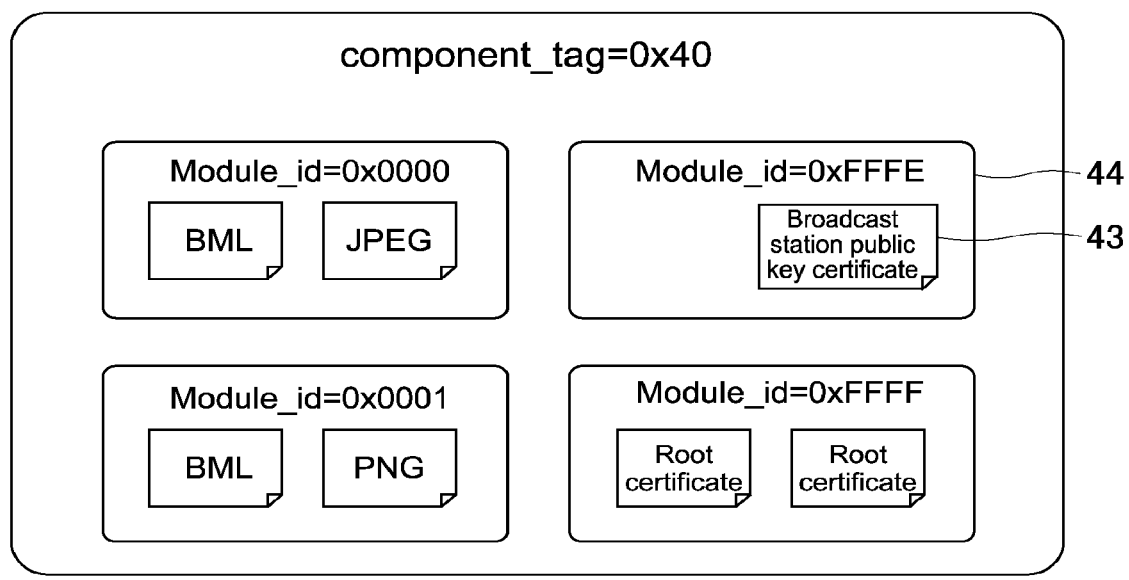
FIG. 19 A diagram conceptually showing a dedicated module method.

FIG. 19 is a diagram conceptually showing a dedicated module method.

In the dedicated module method, a module component_tag=0x40 newly contains a dedicated module (for example module_id=0xFFFE, etc.) 44. The module component_tag=0x40 contains a start text, which is to be started first when a user selects a data broadcast program. The dedicated module (for example module_id=0xFFFE, etc.) 44 is used to transmit a broadcast station public key certificate 43.

Further, in order to notify the information processing apparatus 700 that the broadcast station public key certificate distributed by the above-mentioned dedicated module is updated, a broadcast station public key certificate descriptor and a DII (Download Info Indication) are provided.

FIG. 20 is a diagram showing the configuration of the broadcast station public key certificate descriptor.

The broadcast station public key certificate descriptor (broadcast_certificate_descriptor) describes an ID (broadcaster_certificate_id) identifying a broadcast station public key certificate, and the version (broadcaster_certificate_version) of the broadcast station public key certificate.

Figure 21:
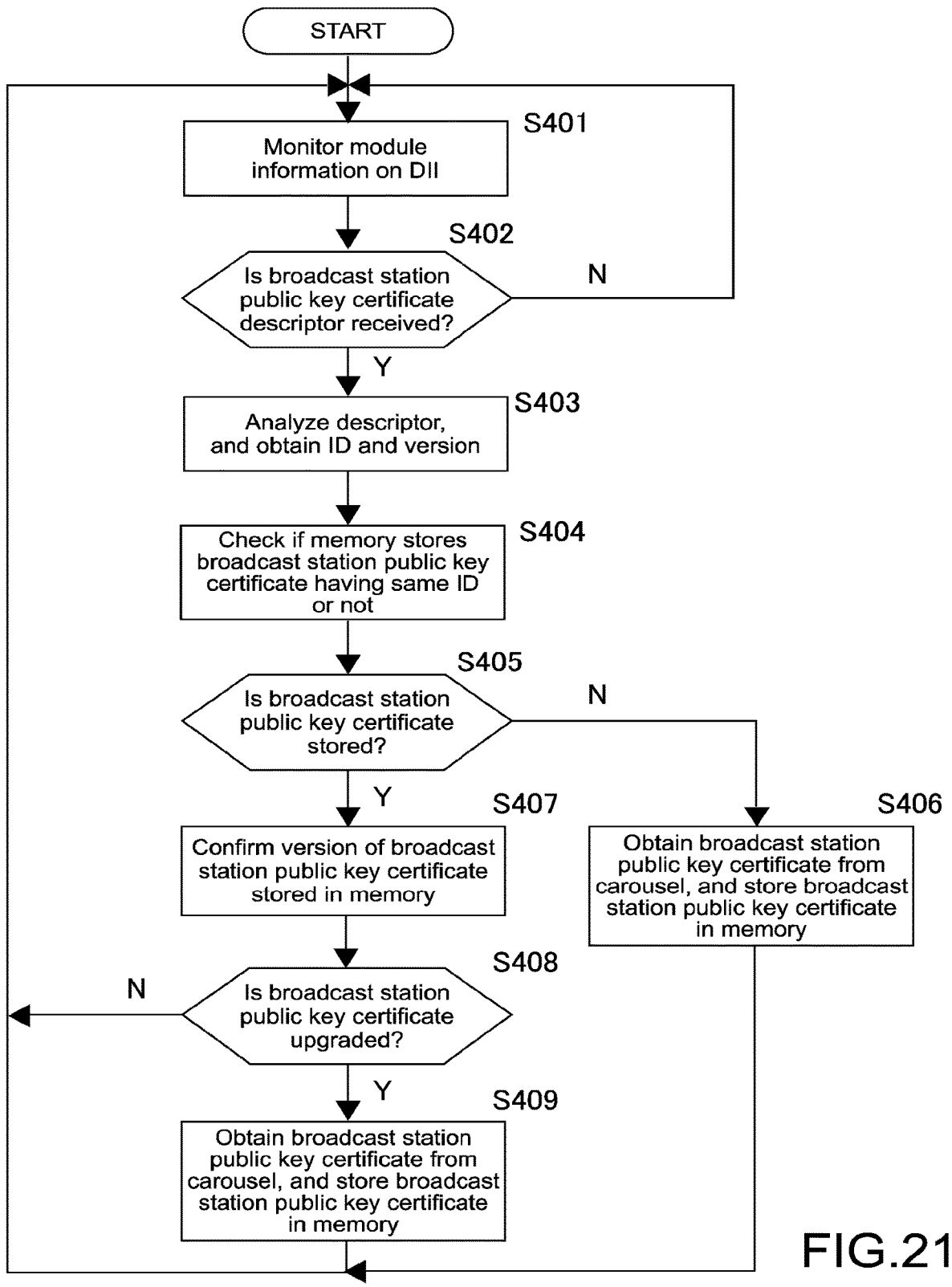
FIG. 21 A flowchart showing a dedicated module method including obtaining and updating a broadcast station public key certificate.

FIG. 21 is a flowchart showing the dedicated module method including obtaining and updating a broadcast station public key certificate.

Firstly, the application controller 708 of the information processing apparatus 700 monitors module information on a DII transmitted in a data carousel (Step S401). If the application controller 708 of the information processing apparatus 700 detects that the module information on the DII includes a broadcast station public key certificate descriptor (Step S402, Y), the application controller 708 analyzes the broadcast station public key certificate descriptor. The application controller 708 extracts the ID and the version from the broadcast station public key certificate descriptor (Step S403).

The application controller 708 compares the ID of the broadcast station public key certificate stored in the memory to the ID obtained this time. The application controller 708 checks if the memory stores a broadcast station public key certificate having the same ID or not (Step S404). If the corresponding broadcast station public key certificate is not stored (Step S405, N), the application controller 708 obtains a broadcast station public key certificate transmitted in a data carousel and stores the obtained broadcast station public key certificate in the memory (Step S406). After that, the application controller 708 monitors module information on a DII again.

If the corresponding broadcast station public key certificate is stored (Step S405, Y), the application controller 708 confirms the version of the broadcast station public key certificate stored in the memory (Step S407). The application controller 708 compares the version of the confirmed broadcast station public key certificate to the version of the broadcast station public key certificate obtained this time. The application controller 708 determines if the broadcast station public key certificate is upgraded or not (Step S408).

If the application controller 708 determines that the broadcast station public key certificate is not upgraded (Step S408, N), the application controller 708 monitors module information on a DII again.

If the application controller 708 determines that the broadcast station public key certificate is upgraded (Step S408, Y), the application controller 708 obtains the broadcast station public key certificate transmitted in a data carousel and stores the obtained broadcast station public key certificate in the memory (Step S409). After that, the application controller 708 monitors module information on a DII again.

As described above, the information processing apparatus 700 is capable of obtaining one or more kinds of broadcast station public key certificates of the latest version having different IDs, and storing them in the memory.

(Data Broadcast Extension Method (First Example))

FIG. 22 is a diagram showing the structure of a root certificate descriptor of a data broadcast extension method (first example).

A data broadcast extension method (first example) includes extending the root certificate type of a root certificate descriptor to transmit a public key certificate of a new service, and describing the ID (broadcaster_certificate_id) identifying a broadcast station public key certificate and the version (broadcaster_certificate_version) of the broadcast station public key certificate in the root_certificate_type.

Figure 23:
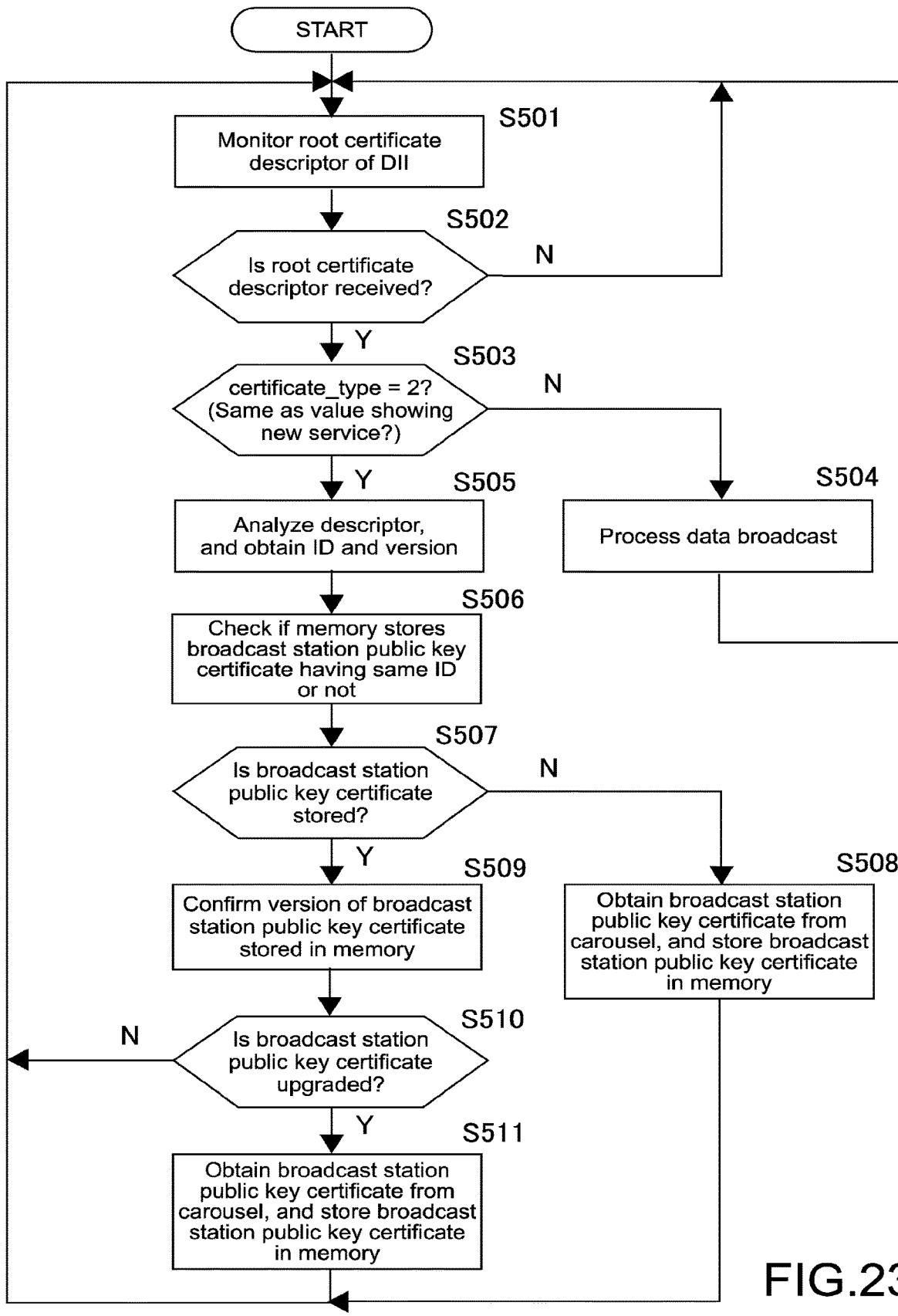
FIG. 23 A flowchart showing the data broadcast extension method (first example) including obtaining and updating a broadcast station public key certificate.

FIG. 23 is a flowchart showing the data broadcast extension method (first example) including obtaining and updating a broadcast station public key certificate.

Firstly, the application controller 708 of the information processing apparatus 700 monitors the root certificate descriptor of a DII transmitted in a data carousel (Step S501). If the application controller 708 of the information processing apparatus 700 detects the root certificate descriptor of the DII (Step S502, Y), the application controller 708 analyzes the root certificate descriptor. The application controller 708 determines if the root certificate descriptor describes a value (root_certificate_type=2) showing a new service or not (Step S503). If the root certificate descriptor does not describe a value (root_certificate_type=2) showing a new service, the application controller 708 processes data broadcast (Step S504). After that, the application controller 708 monitors the root certificate descriptor of a DII again.

If the root certificate descriptor describes a value (root_certificate_type=2) showing a new service, the application controller 708 extracts the ID and the version of the broadcast station public key certificate from the root certificate descriptor (Step S505). Since the subsequent operation from Step S506 to Step S511 is the same as the operation from Step S404 to Step S409 of the dedicated module method, description will be omitted.

The application controller 708 compares the ID of the broadcast station public key certificate stored in the memory to the ID obtained this time. The application controller 708 checks if the memory stores a broadcast station public key certificate having the same ID or not (Step S404). If the corresponding broadcast station public key certificate is not stored (Step S405, N), the application controller 708 obtains a broadcast station public key certificate transmitted in a data carousel and stores the obtained broadcast station public key certificate in the memory (Step S406). After that, the application controller 708 monitors the root certificate descriptor on a DII again.

If the corresponding broadcast station public key certificate is stored (Step S405, Y), the application controller 708 confirms the version of the broadcast station public key certificate stored in the memory (Step S407). The application controller 708 compares the version of the confirmed broadcast station public key certificate to the version of the broadcast station public key certificate obtained this time. The application controller 708 determines if the broadcast station public key certificate is upgraded or not (Step S408).

If the application controller 708 determines that the broadcast station public key certificate is not upgraded (Step S408, N), the application controller 708 monitors module information on a DII again.

If the application controller 708 determines that the broadcast station public key certificate is upgraded (Step S408, N), the application controller 708 obtains the broadcast station public key certificate transmitted in a data carousel and stores the obtained broadcast station public key certificate in the memory (Step S409). After that, the application controller 708 monitors module information on a DII again.

As described above, the information processing apparatus 700 is capable of obtaining one or more kinds of broadcast station public key certificates of the latest version having different IDs, and storing them in the memory.

(Data Broadcast Extension Method (Second Example))

According to a data broadcast extension method (second example), a root certificate descriptor describes storage areas, each of which is capable of transmitting a public key certificate for data broadcast. One fixed storage area out of those storage areas is allocated for a new service. The ID (broadcaster_certificate_id) identifying the broadcast station public key certificate and the version (broadcaster_certificate_version) of the broadcast station public key certificate are described in the fixed storage area. Further, for example, as shown in FIG. 24, the root certificate descriptor describes a new flag (broadcaster_certificate_flag). For example, if the flag value is "1", then it means that the broadcast station public key certificate is to be transmitted. If the flag value is "0", then it means that the broadcast station public key certificate is not to be transmitted.

Figure 25:
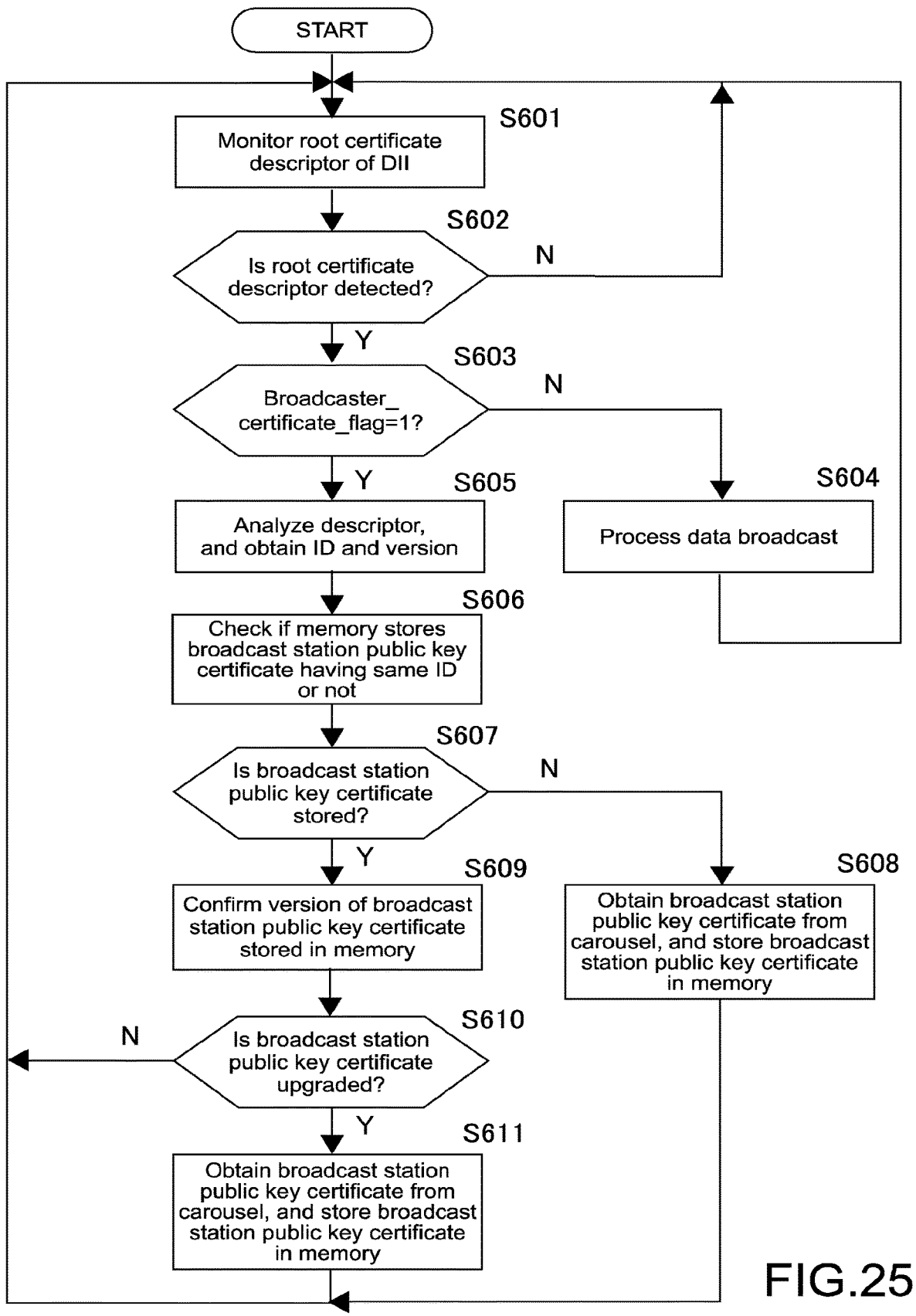
FIG. 25 A flowchart showing the data broadcast extension method (second example) including obtaining and updating a broadcast station public key certificate.

FIG. 25 is a flowchart showing the data broadcast extension method (second example) including obtaining and updating a broadcast station public key certificate.

Firstly, the application controller 708 of the information processing apparatus 700 monitors the root certificate descriptor of a DII transmitted in a data carousel (Step S601). If the application controller 708 of the information processing apparatus 700 detects the root certificate descriptor of the DII (Step S502, Y), the application controller 708 analyzes the root certificate descriptor. The application controller 708 confirms the value of the flag (broadcaster_certificate_flag). If the flag value is "0", the application controller 708 processes data broadcast (Step S504). After that, the application controller 708 monitors the root certificate descriptor of a DII again.

If the flag value is "0", the application controller 708 extracts the ID and the version of the broadcast station public key certificate from a predetermined storage area out of a plurality of storage areas of the root certificate descriptor, each of which is capable of transmitting a public key certificate for data broadcast (Step S605). Since the subsequent operation of Step S606 to Step S611 is the same as the operation of Step S404 to Step S409 of the dedicated module method, description thereof will be omitted.

As described above, the information processing apparatus 700 is capable of obtaining one or more kinds of broadcast station public key certificates of the latest version having different IDs, and storing them in the memory.

(Method of Attaching Electronic Signature to XML-AIT and Verifying the Electronic Signature)

In the above-mentioned method, an electronic signature is attached to an application. Alternatively, an electronic signature may be attached to an XML-AIT. According to this method, if a plurality of broadcast stations allow one application to use their broadcast resources, electronic signatures of all the broadcast stations, which allow the application to use their broadcast resources, are attached to an XML-AIT.

According to this method, it is not possible to detect falsification of an application directly. In view of this, the hash value of an application is embedded in an XML-AIT. The information processing apparatus 700 compares a hash value calculated based on the entity of an application to the received hash value embedded in an XML-AIT. As a result, the information processing apparatus 700 is capable of detecting falsification of the application indirectly. Hereinafter, this method will be described.

Figure 26:
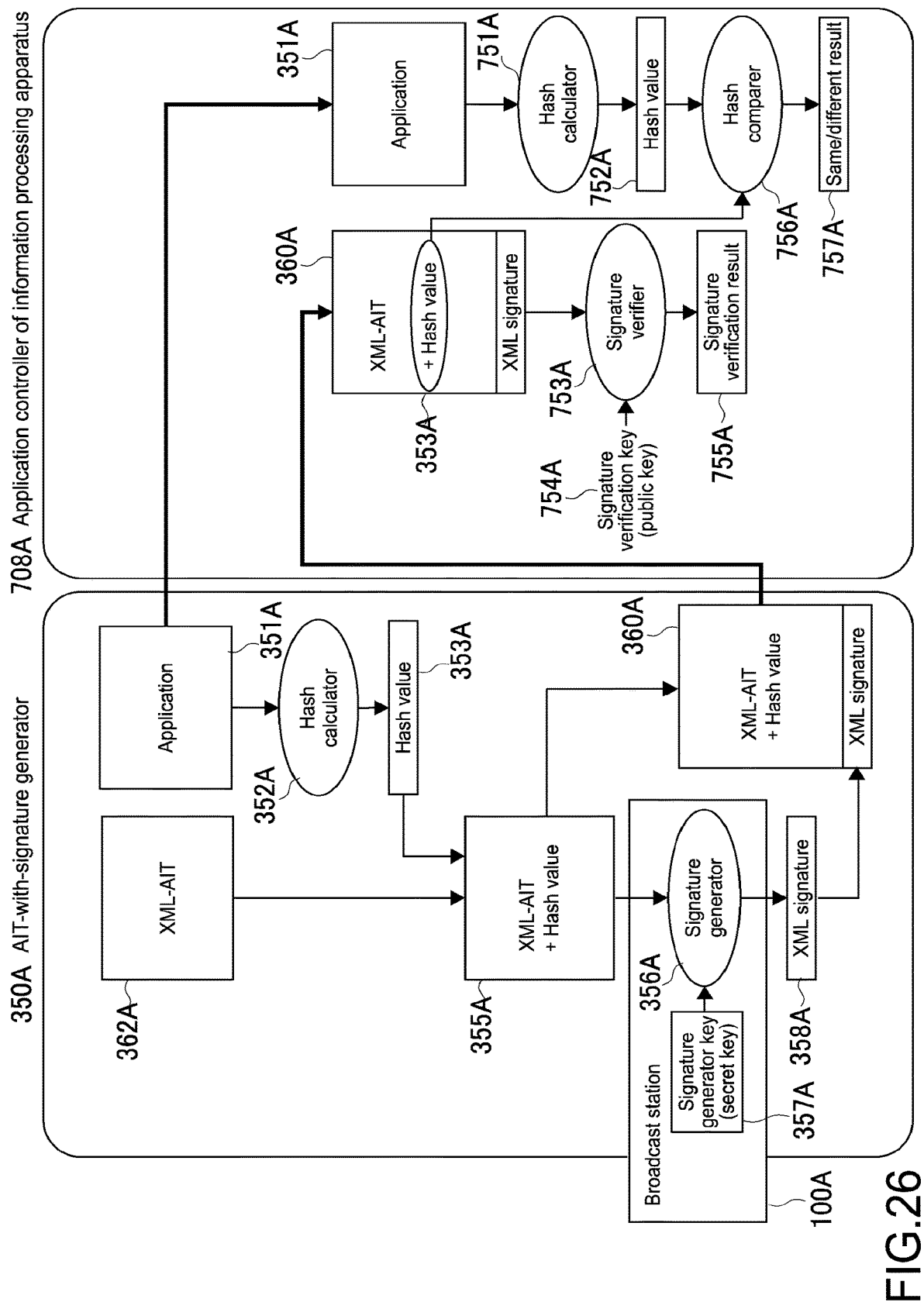
FIG. 26 A diagram illustrating how to generate an electronic signature and a hash value, and a scheme of verifying them.

FIG. 26 is a diagram illustrating how to generate a hash value and an electronic signature attached to an XML-AIT, and the scheme of verifying them.

The server includes an AIT-with-signature generator 350A. Specifically, a program and a CPU realize the AIT-with-signature generator 350A. The program is loaded into a main memory, and is configured to generate an electronic signature and a hash value. The CPU executes the program.

The AIT-with-signature generator 350A calculates a hash value 353A from the entity of an other-than-broadcast-managed application 351A by using a predetermined hash calculator 352A. Examples of a hash algorithm include SHA-1 and SHA-2 standardized based on FIPS PUB 180-1, 180-2, and other algorithms.

The AIT-with-signature generator 350A merges an XML-AIT 362A of the other-than-broadcast-managed application 351A with the hash value 353A to thereby generate an XML-AIT-with-hash-value 355A.

An application creator requests a broadcast station 100A to authenticate the other-than-broadcast-managed application 351A and the XML-AIT 355A.

The broadcast station 100 examines the content of the other-than-broadcast-managed application 351A and the content of the XML-AIT 355A, which the application creator requested to authenticate. If there is no problem, the broadcast station 100 selects, as a signature generator key 357A, a secret key out of a pair of the secret key issued by a root CA 900 (FIG. 1) and a broadcast station public key certificate. The broadcast station 100 provides the secret key to a signature generator 356A. The signature generator 356A generates the digest of the XML-AIT 355A by using a hash function for a signature, encodes the digest by using a signature generator key (secret key) 357A, and generates an XML signature 358A. The broadcast station 100A replies the generated XML signature 358A to the server.

The AIT-with-signature generator 350A of the server adds the XML signature 358A replied from the broadcast station 100A to the XML-AIT-with-hash-value 355A, generates an XML-AIT-with-electronic-signature 360A, and delivers the XML-AIT-with-electronic-signature 360A to the information processing apparatus 700A.

An application controller 708A of the information processing apparatus 700 calculates a hash value 752A based on the other-than-broadcast-managed application 351A obtained from the server by using a predetermined hash calculator 751A (hash function). The hash function used herein should be the same as the hash function of the hash calculator 352A of the AIT-with-signature generator 350A of the server. So the application controller 708A confirms the hash algorithm described in the XML-AIT-with-electronic-signature 360A, which is obtained from the server. The application controller 708A determines if the hash algorithm described in the XML-AIT-with-electronic-signature 360A is the same as the hash algorithm of the hash calculator 751A (hash function). If the application controller 708A determines that those hash algorithms are different, the application controller 708A changes the hash calculator 751A (hash function) to the hash algorithm of the hash calculator 352A of the AIT-with-signature generator 350A of the server.

The application controller 708A compares the hash value 353A, which is extracted from the XML-AIT-with-electronic-signature 360A obtained from the server, to the hash value 752A by using the hash comparer 756A. The application controller 708A obtains a result 757A, which shows that the hash value 353A is the same as or different from the hash value 752A.

The application controller 708A extracts an XML signature from the XML-AIT-with-electronic-signature 360A obtained from the server by using the signature generator 753A. The application controller 708A verifies this XML signature by using a signature verification key (public key) 754A to thereby obtain a signature verification result 755A.

According to the modification example, a hash value is added to an application, and this application is provided to the information processing apparatus 700. Then the information processing apparatus 700 compares a hash value, which is calculated based on the application obtained from the application server 300, to a hash value transmitted in the XML-AIT. As a result, the information processing apparatus 700 is capable of determining validity of the application.

(6. To Manage the Expire Date of the XML-AIT)

Next, how to manage the expire date of the XML-AIT will be described.

According to the information processing system 10 of this embodiment, an XML-AIT stored in the XML-AIT server 400, i.e., an XML-AIT delivered to the information processing apparatus 700, is sometimes updated.

In view of this, the application controller 708 of the information processing apparatus 700 caches an obtained XML-AIT in a built-in memory. When the information processing apparatus 700 is offline, the application controller 708 refers to the cached XML-AIT, and controls the operation of the other-than-broadcast-managed application. Here, the XML-AIT, which the information processing apparatus 700 obtains the latest, is cached.

Every time a user selects an other-than-broadcast-managed application to be started by the application launcher, the application controller 708 makes an inquiry to the XML-AIT server 400 about date/time of the latest update of the XML-AIT. The application controller 708 compares the date/time of the latest update of the XML-AIT, which is obtained based on the inquiry, to the cache date/time of the cached XML-AIT. If the date/time of the latest update of the XML-AIT is later (newer) than the cache date/time of the cached XML-AIT, the application controller 708 obtains the XML-AIT from the XML-AIT server 400. The application controller 708 writes the obtained XML-AIT over the cached XML-AIT. Further, if the date/time of the latest update of the XML-AIT, which is obtained based on the inquiry, is the same as or earlier (older) than the cache date/time of the cached XML-AIT, the application controller 708 obtains no XML-AIT from the XML-AIT server 400. The application controller 708 holds the cached XML-AIT as it is.

Further, if a user selects an other-than-broadcast-managed application when the information processing apparatus 700 is offline, the application controller 708 controls the operation of the other-than-broadcast-managed application by using the cached XML-AIT.

Meanwhile, if it is possible to use a cached XML-AIT for an indefinite period, the purpose of updating an XML-AIT is never reflected in control of the operation of an other-than-broadcast-managed application.

In view of this, the data structure of an XML-AIT includes the expire date (expireDate) 22 (see FIG. 2) of an XML-AIT. Absolute date/time or relative date/time specifies the expire date 22. For example, the absolute date/time includes year, month, date, time, and the like. Alternatively, the absolute date/time may only include year, month, and date, as a matter of course. For example, the relative date/time includes the elapsed time after obtaining an XML-AIT, or the like. Note that in this embodiment, it is assumed that the expire date 22 is absolute date/time.

Every time a user selects an other-than-broadcast-managed application to be started by using the application launcher, the application controller 708 of the information processing apparatus 700 determines if the expire date 22 of the XML-AIT obtained from the XML-AIT server 400 is expired or not, and if the expire date 22 of the cached XML-AIT is expired or not. If the expire date 22 is not expired, the application controller 708 starts the other-than-broadcast-managed application based on the XML-AIT. If the expire date 22 is expired, the application controller 708 does not start the other-than-broadcast-managed application.

Figure 27:
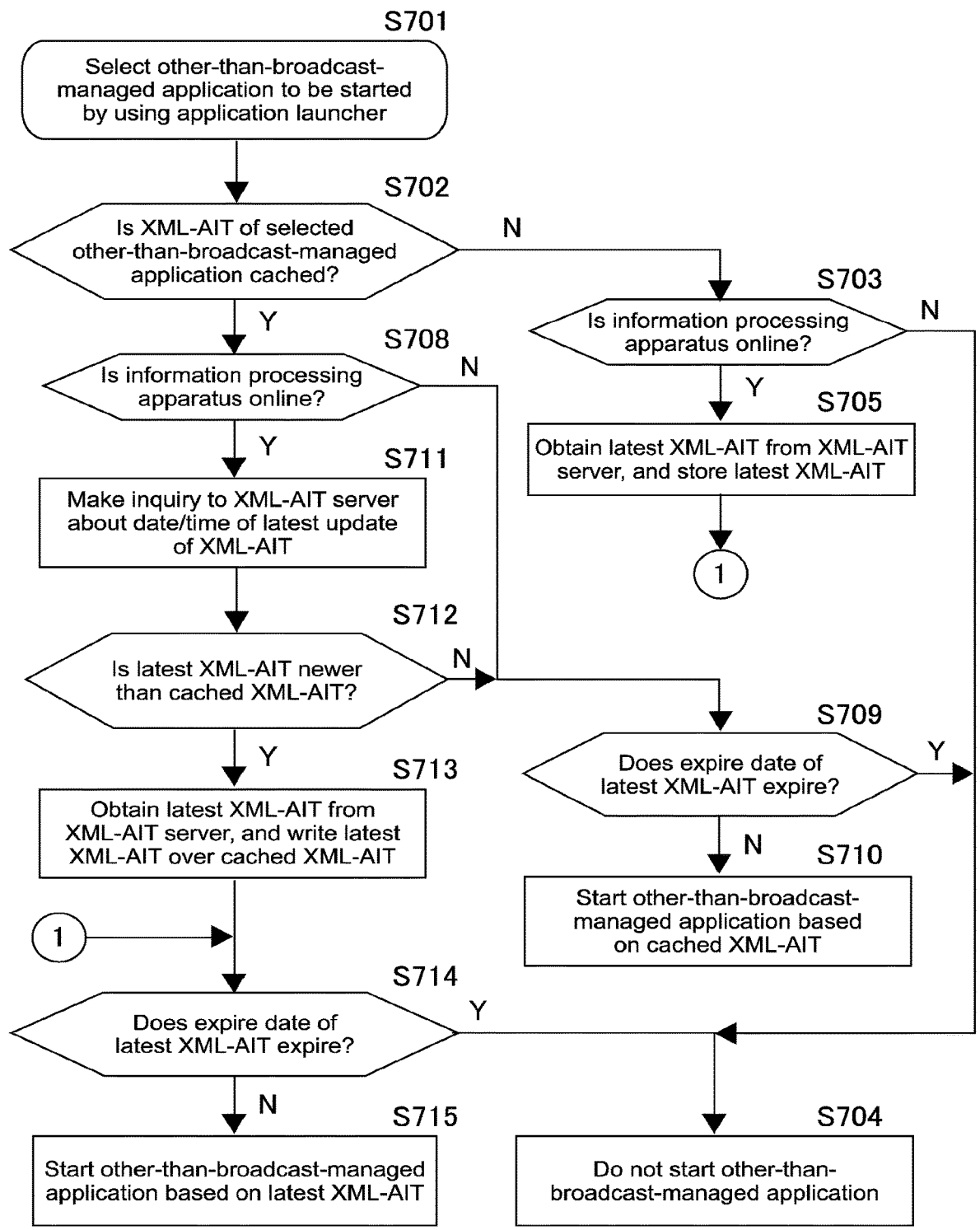
FIG. 27 A flowchart showing a control flow from selecting an other-than-broadcast-managed application to be started by using the application launcher until deciding to start the other-than-broadcast-managed application based on an expire date of an XML-AIT or not.

Next, with reference to FIG. 27, the control flow from selecting an other-than-broadcast-managed application to be started by using the application launcher until deciding to start the other-than-broadcast-managed application based on the expire date 22 of an XML-AIT or not will be described.

A user selects an other-than-broadcast-managed application to be started by using the application launcher (Step S701). Then the application controller 708 checks if the XML-AIT of the selected other-than-broadcast-managed application is stored (cached) or not (Step S702).

If the cache is not stored (cached) (Step S702, N), the application controller 708 checks if the information processing apparatus 700 is currently online or not (Step S703). If the information processing apparatus 700 is offline (Step S703, N), it is not possible to start the other-than-broadcast-managed application. So the application controller 708 quits the operation (Step S704).

If the information processing apparatus 700 is online (Step S703, Y), the application controller 708 obtains the latest XML-AIT from the XML-AIT server 400 and stores the latest XML-AIT (Step S705).

Next, the application controller 708 determines if the expire date 22 of the obtained XML-AIT is expired or not (Step S706). If the expire date 22 is expired (Step S706, Y), it is not possible to start the other-than-broadcast-managed application. So the application controller 708 quits the operation (Step S704). If the expire date 22 is not expired (Step S706, N), the application controller 708 starts the other-than-broadcast-managed application based on the XML-AIT (Step S707).

Next, description will be made on the case where the cache is not stored in Step S702.

In this case, the application controller 708 checks if the information processing apparatus 700 is currently online or not (Step S708). If the information processing apparatus 700 is offline (Step S708, N), the application controller 708 determines if the expire date 22 of the cached XML-AIT is expired (Step S709). If the expire date 22 is expired (Step S709, Y), it is not possible to start the other-than-broadcast-managed application. So the application controller 708 quits the operation (Step S704). If the expire date 22 is not expired (Step S709, N), the application controller 708 starts the other-than-broadcast-managed application by using the cached XML-AIT (Step S710).

In Step S708, if the information processing apparatus 700 is online (Step S708, Y), the application controller 708 makes an inquiry to the XML-AIT server 400 about the date/time of the latest update of the XML-AIT (Step S711).

Next, the application controller 708 compares the date/time of the latest update of the XML-AIT to the update date/time of the cached XML-AIT. If the date/time of the latest update of the XML-AIT is newer than the update date/time of the cached XML-AIT (Step S712, Y), the application controller 708 obtains the latest XML-AIT from the XML-AIT server 400. The application controller 708 writes the latest XML-AIT over the cached XML-AIT, and stores the overwritten XML-AIT (Step S713).

After that, the application controller 708 determines if the expire date 22 of the overwritten and stored XML-AIT is expired or not (Step S714). If the expire date 22 is expired (Step S714, Y), it is not possible to start the other-than-broadcast-managed application. So the application controller 708 quits the operation (Step S704). If the expire date 22 is not expired (Step S714, N), the application controller 708 starts the other-than-broadcast-managed application based on the overwritten and stored XML-AIT (Step S715).

(7. To Control Based on an Application Type)

Next, control based on an application type will be described.

As shown in FIG. 2, the application descriptors of the XML-AIT include an application type descriptor (applicationType) 25.

FIG. 28 is a diagram showing the syntax of the application type descriptor 25.

The application type descriptor 25 may describe an area type (area_type), a format type (format_type), a context type (context_type), and the like.

(Area Type)

Firstly, the area type (area_type) will be described.

The area type is information, which is used to define the type of screen control used by an other-than-broadcast-managed application. The kinds of information, which is used to define the type of screen control, are as follows.

1. Whole: full screen control
2. Partial: partial screen control
3. Invisible: no screen control

[Full Screen Control]

Figure 29:
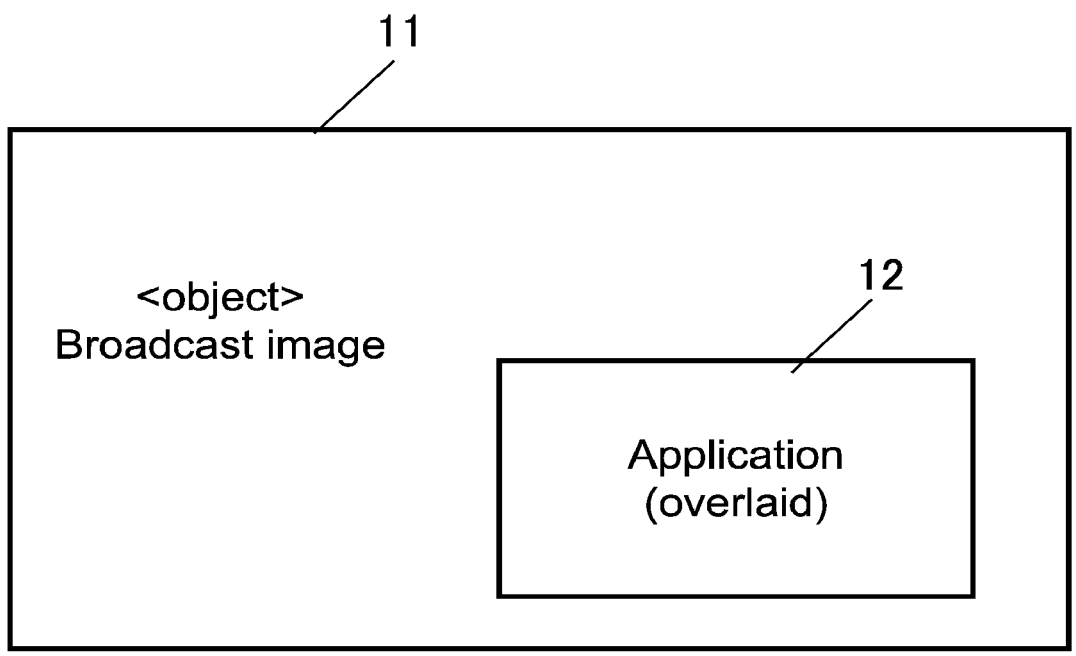
FIG. 29 A diagram illustrating full screen control.
Figure 30:
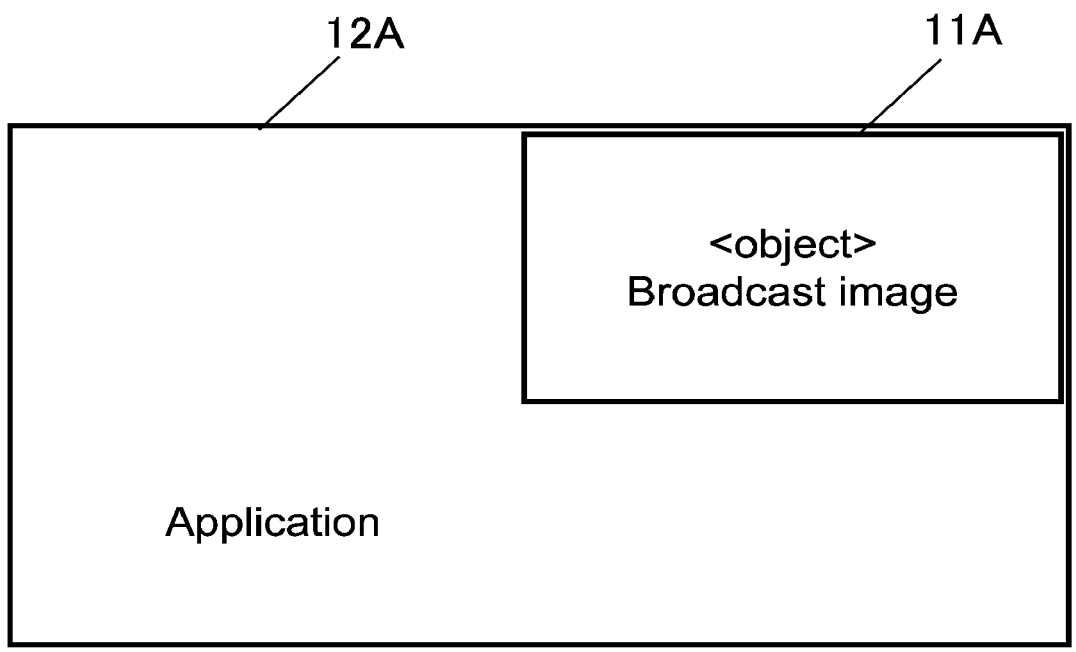
FIG. 30 A diagram illustrating the full screen control.

Each of FIG. 29 and FIG. 30 is a diagram illustrating the full screen control.

According to the full screen control type, display on the entire screen of the display unit is controlled.

According to the full screen control, an other-than-broadcast-managed application is displayed as follows. An object element specifies a broadcast image, and defines the area in which the broadcast image is displayed. Examples of the mode of displaying a broadcast image and an other-than-broadcast-managed application are as follows. For example, in the mode shown in FIG. 29, a full-screen broadcast image 11 is displayed. A display area 12 of an other-than-broadcast-managed application is smaller than the full screen size, and overlaps with the broadcast image 11. Further, for example, in the mode shown in FIG. 30, a full-screen other-than-broadcast-managed application is displayed in a display area 12A. A broadcast image 11A is scaled down, and a child screen is obtained. The broadcast image 11A (child screen) is displayed over the display area 12A.

Note that only a full-screen-control other-than-broadcast-managed application and no-screen-control other-than-broadcast-managed applications can be operated in parallel. In other words, one full-screen-control other-than-broadcast-managed application and one or more no-screen-control other-than-broadcast-managed applications can be operated in parallel.

[Partial Screen Control]

Figure 31:
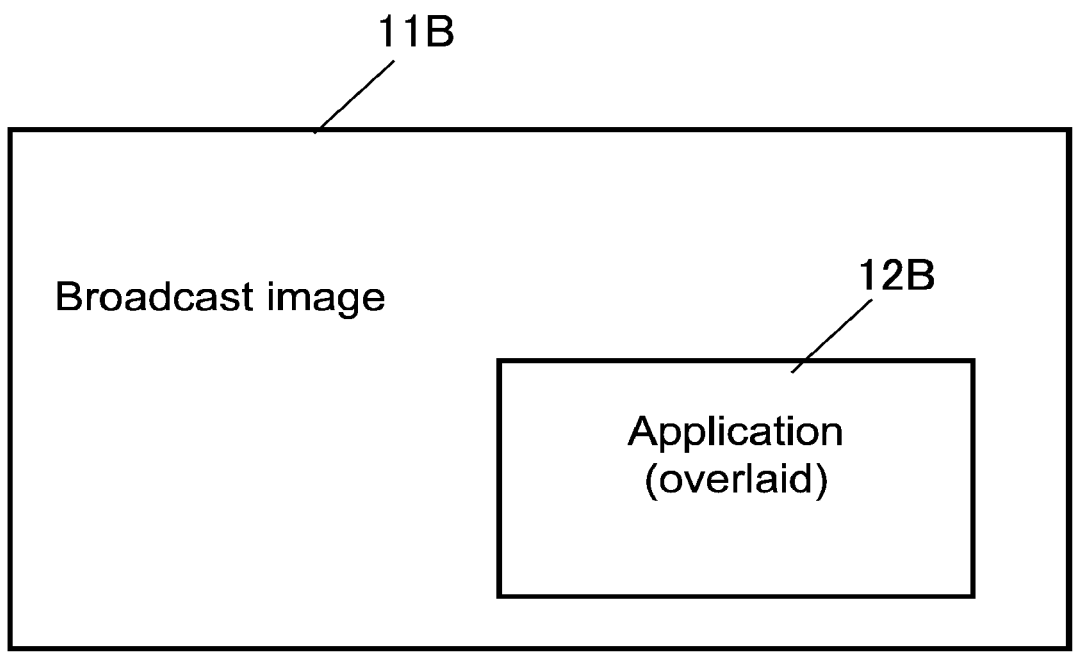
FIG. 31 A diagram illustrating partial screen control.
Figure 32:
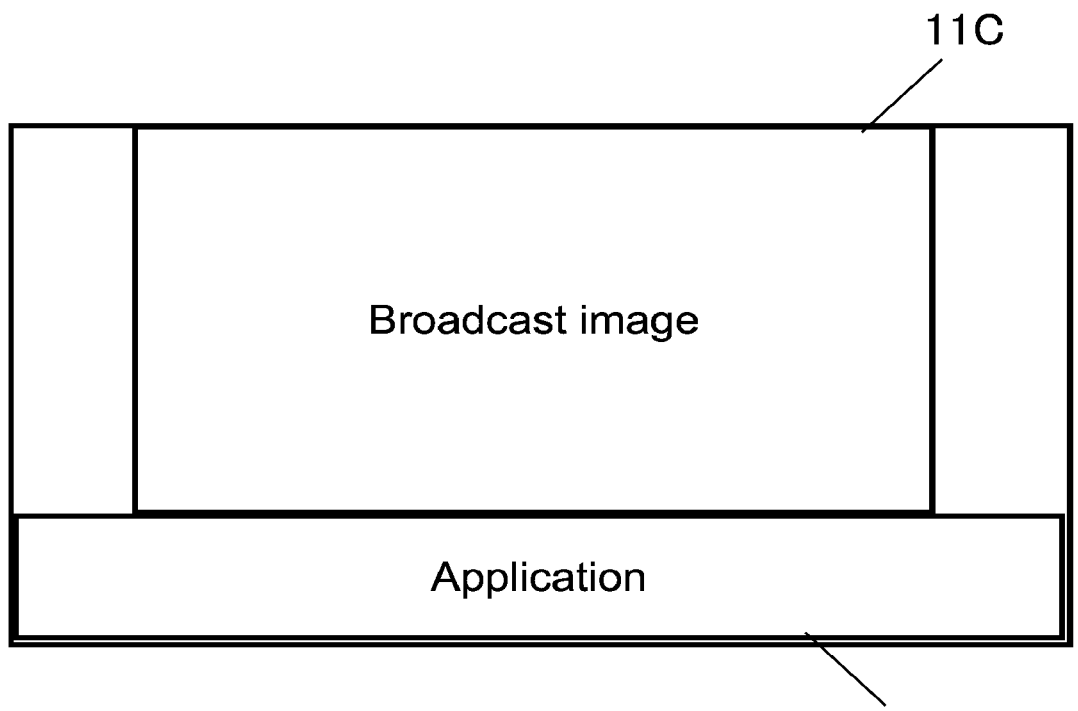
FIG. 32 A diagram illustrating the partial screen control.
Figure 33:
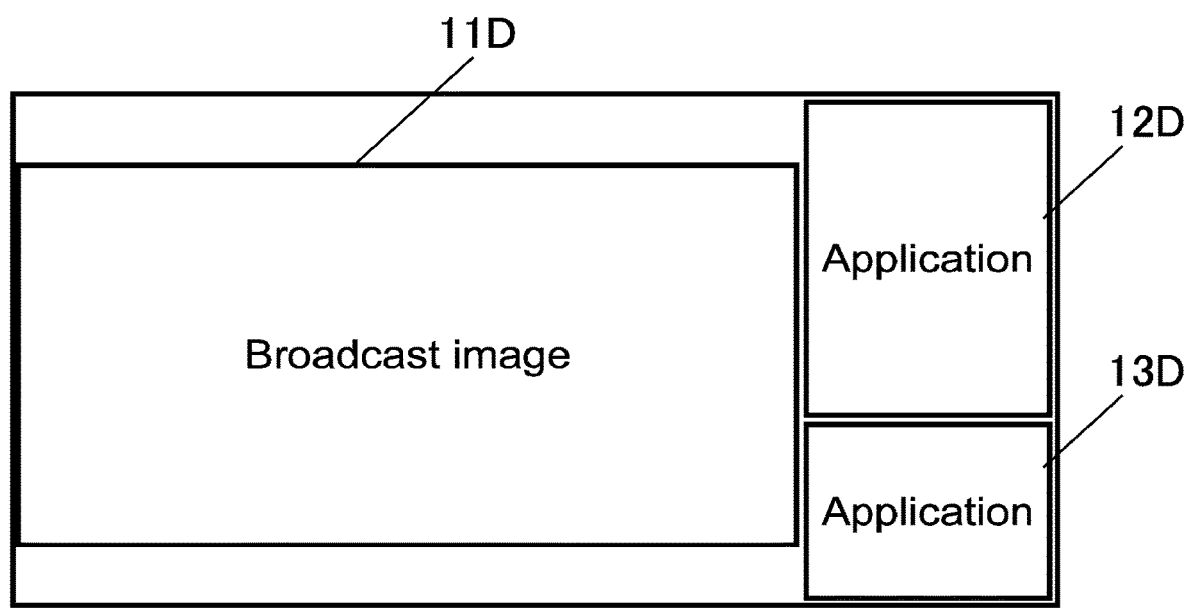
FIG. 33 A diagram illustrating the partial screen control.

Each of FIG. 31, FIG. 32, and FIG. 33 is a diagram illustrating the partial screen control.

According to the partial screen control type, display of part of the screen of the display unit is controlled.

According to the partial screen control, an other-than-broadcast-managed application is displayed as follows. Only the size of the display area 12B of an other-than-broadcast-managed application is specified. The application controller 708 controls the position of the display area 12B.

Examples of the mode of displaying a broadcast image and an other-than-broadcast-managed application are as follows. For example, as shown in FIG. 31, a full-screen broadcast image 11B is displayed. A display area 12B of an other-than-broadcast-managed application is smaller than the full screen size, and overlaps with the broadcast image 11B. Here, the difference from the full screen control of FIG. 29 is as follows. According to the full screen control, the displayed full-screen broadcast image 11 is specified by the object element of an other-than-broadcast-managed application. To the contrary, according to the partial screen control, the displayed full-screen broadcast image 11B is selected by a user.

Further, for example, in the mode shown in FIG. 32, a broadcast image 11C is scaled down, the downsized broadcast image 11C is displayed on one side of the screen, and a display area 12C for an other-than-broadcast-managed application is displayed in the vacant area. Here, the application controller 708 controls the reduction ratio and the position of the broadcast image display area 11C, and the position of the display area 12C for an other-than-broadcast-managed application.

Further, for example, in the mode shown in FIG. 33, a broadcast image 11D is scaled down, the downsized broadcast image 11D is displayed on one side of the screen, and a plurality of display areas 12D and 13D for other-than-broadcast-managed applications are displayed in the vacant area. Also in this example, the application controller 708 controls the reduction ratio and the position of the broadcast image 11D, and the positions of the plurality of display areas 12D and 13D for other-than-broadcast-managed applications.

Note that a partial-screen-control other-than-broadcast-managed application and one or more no-screen-control other-than-broadcast-managed applications can be operated in parallel.

[No Screen Control]

According to the no screen control, an other-than-broadcast-managed application is not displayed at all on the screen of the display unit, and the script is only executed invisibly. A plurality of no-screen-control other-than-broadcast-managed applications can be operated in parallel. Further, a plurality of no-screen-control other-than-broadcast-managed applications and a full-screen-control or partial-screen-control other-than-broadcast-managed application can be operated in parallel.

(Format Type)

Next, the format type (format_type) will be described.

The kinds of the format type of an other-than-broadcast-managed application are as follows.
1. packaged: packaged
2. web: web-based What the packaged other-than-broadcast-managed application is, what the web-based other-than-broadcast-managed application is, and how the information processing apparatus 700 obtains the packaged and web-based other-than-broadcast-managed applications have been described above.

Here, how the application controller 708 of the information processing apparatus 700 controls an other-than-broadcast-managed application based on the format type will be described. Control based on the format type is effective if an electronic signature is attached to an XML-AIT and verified. As described above, according to this method, a hash value of an other-than-broadcast-managed application is calculated and attached to an XML-AIT to detect falsification of the other-than-broadcast-managed application.

At this time, a hash value described in an XML-AIT of a packaged other-than-broadcast-managed application is calculated based on all the files of the other-than-broadcast-managed application. In other words, the AIT-with-signature generator 350A of FIG. 26 calculates the hash value 353A based on all the files of the packaged other-than-broadcast-managed application 351A by using the predetermined hash calculator 352A.

After an other-than-broadcast-managed application is started, the application controller 708 (application controller 708A of FIG. 26) of the information processing apparatus 700 refers to the XML-AIT, and confirms the format type of the other-than-broadcast-managed application.

If the format type of an other-than-broadcast-managed application is the packaged type, the application controller 708A calculates the hash value 752A based on all the resource files of the other-than-broadcast-managed application 351A. The application controller 708A compares the calculated hash value 752A to the hash value 353A described in the XML-AIT. The application controller 708A determines if the hash value 752A is the same as or different from the hash value 353A.

Further, a hash value is described in an XML-AIT of a web-based other-than-broadcast-managed application, and is calculated based on a markup text file such as an HTML text, which configures the front page of the other-than-broadcast-managed application. Alternatively, a hash value may be calculated based on all the resource files configuring the front page. In this embodiment, it is assumed that a hash value is calculated based on a markup text file such as an HTML text, which configures a front page. Description thereof will be made.

The application controller 708A starts a web-based other-than-broadcast-managed application, then refers to an XML-AIT, and checks the format type of the other-than-broadcast-managed application. If the format type of the other-than-broadcast-managed application is the web-based type, the application controller 708A calculates the hash value 752A based on a markup text file such as an HTML text, which configures the front page of the other-than-broadcast-managed application 351A. The application controller 708A compares the calculated hash value 752A to the hash value 353A stored in the XML-AIT. The application controller 708A determines if the hash value 752A is the same as or different from the hash value 353A.

(Context Type)

Next, the context type will be described.

The kinds of the context type (context_type) are as follows.
1. application: application-oriented
2. tv: broadcast-receiving-oriented

[Application-Oriented Type]

According to the application-oriented type, for example, a user of the information processing apparatus 700 does not specify a broadcast service, which is to be displayed as an object element. Instead, an other-than-broadcast-managed application specifies a broadcast service.

Figure 35:
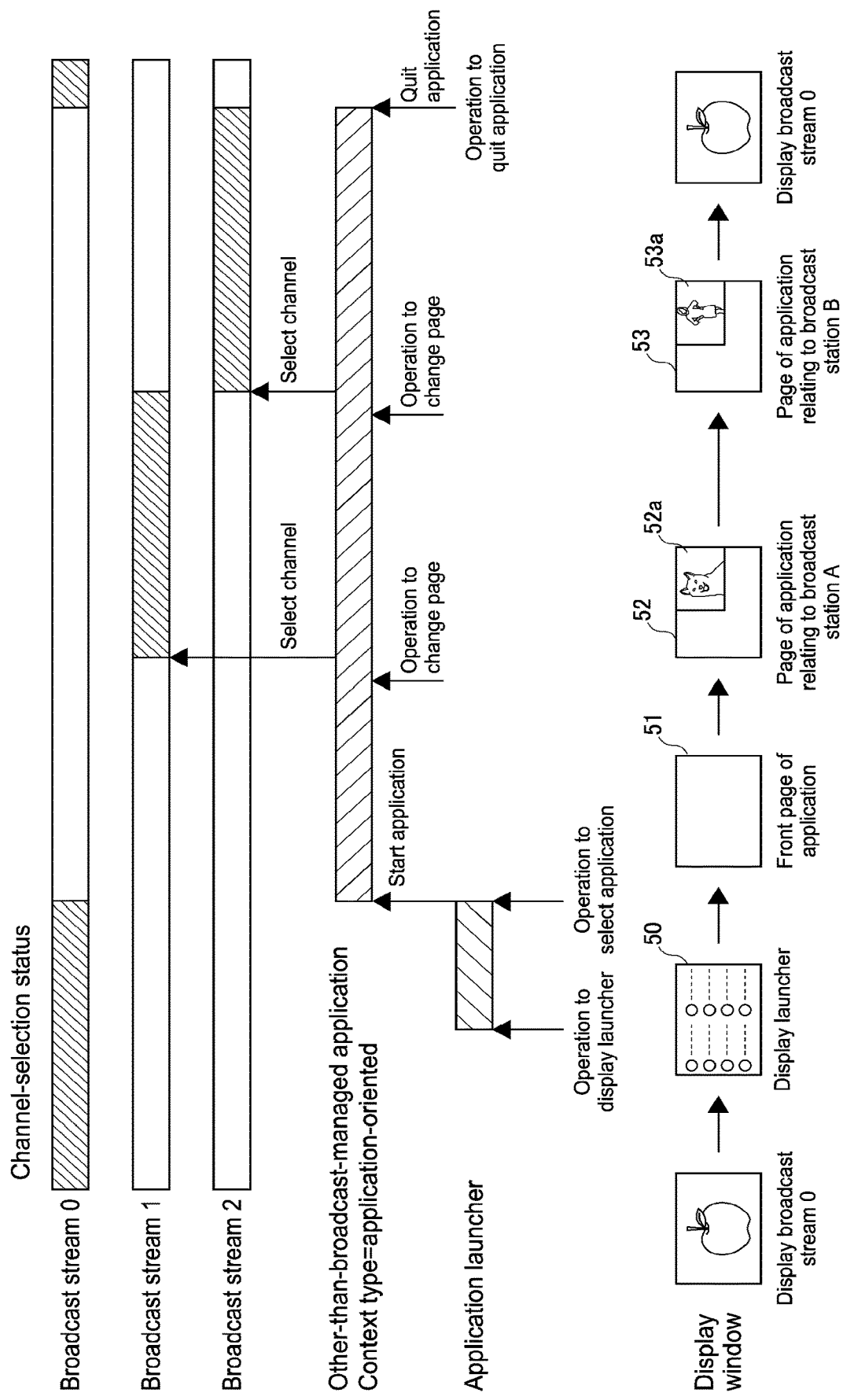
FIG. 35 A diagram illustrating an application-oriented other-than-broadcast-managed application, and a behavior thereof depending on operations to the other-than-broadcast-managed application by a user.

FIG. 35 is a diagram illustrating an application-oriented other-than-broadcast-managed application, and the behavior thereof depending on operations to the other-than-broadcast-managed application by a user.

The channel of a broadcast stream 0 is selected. Then a user of the information processing apparatus 700 operates an application launcher button of a remote controller, for example. As a result, the display unit of the information processing apparatus 700 displays an application launcher 50.

The user selects an other-than-broadcast-managed application by using the application launcher 50. Then the application controller 708 of the information processing apparatus 700 starts the other-than-broadcast-managed application based on the XML-AIT of the other-than-broadcast-managed application. At this time, the application controller 708 refers to the XML-AIT, and checks the context type of the other-than-broadcast-managed application.

Here, it is assumed that the context type of the other-than-broadcast-managed application, which is selected by the user, is the application-oriented type.

In this case, a broadcast service, which is displayed as an object element, depends on an other-than-broadcast-managed application. Because of this, the application controller 708 cancels the channel-selection status of the broadcast stream 0, which is selected by the user.

The application controller 708 starts the other-than-broadcast-managed application. In this example, firstly, a front page 51 of the other-than-broadcast-managed application is displayed. The front page 51 contains, for example, one or more hyperlinks, which are used to display pages in relation to one or more broadcast stations. Note that in this example, the other-than-broadcast-managed application includes the front page 51, and one or more linked pages 52 and 53. Each of the linked pages 52 and 53 related to a broadcast station is configured to provide a broadcast stream of the related broadcast station as a broadcast service, which is displayed as an object element. In other words, the linked page 52 is configured to display a child screen 52*a* on the page 52, and the child screen 52*a* displays the image of the broadcast stream of the related broadcast station. The linked page 53 is configured to display a child screen 53*a* on the page 53, and the child screen 53*a* displays the image of the broadcast stream of the related broadcast station.

A user of the information processing apparatus 700 operates the front page 51 to select a page in relation to a desired broadcast station. Then the page 52, which relates to the selected broadcast station, is displayed. The child screen 52*a* is arranged on the page 52. The child screen 52*a* displays the image of the broadcast stream (broadcast stream 1) of the selected broadcast station.

After that, similarly, it is assumed that the user of the information processing apparatus 700 operates the front page 51 to select a page in relation to another broadcast station. In other words, the front page 51 contains one or more hyperlinks, which are used to display pages in relation to one or more other broadcast stations.

After the page-change operation, the page 53, which relates to the selected other broadcast station, is displayed. The child screen 53*a* is arranged on the page 53. The child screen 53*a* displays the image of the broadcast stream (broadcast stream 2) of the selected broadcast station.

The user operates the information processing apparatus 700 to quit the other-than-broadcast-managed application. Then the other-than-broadcast-managed application is quit. When the other-than-broadcast-managed application is quit, the channel-selection status of a broadcast stream is decided based on the context type.

The context type of the other-than-broadcast-managed application, which is started this time, is the application-oriented type. In this case, the application controller 708 of the information processing apparatus 700 quits the other-than-broadcast-managed application. After that, the application controller 708 returns the channel-selection status to the broadcast stream 0, which was selected immediately before starting the other-than-broadcast-managed application.

A user did not directly select a channel by himself when an other-than-broadcast-managed application was running. Because of this, after the other-than-broadcast-managed application is quit, the channel-selection status is returned to the broadcast stream 0, which was selected immediately before starting the other-than-broadcast-managed application.

This is desirable not to give the user a feeling of strangeness.

[Broadcast-Receiving-Oriented Type]

According to the broadcast-receiving-oriented type, for example, an other-than-broadcast-managed application does not specify a broadcast service, which is to be displayed as an object element. Instead, a user of the information processing apparatus 700 specifies a broadcast service.

Figure 36:
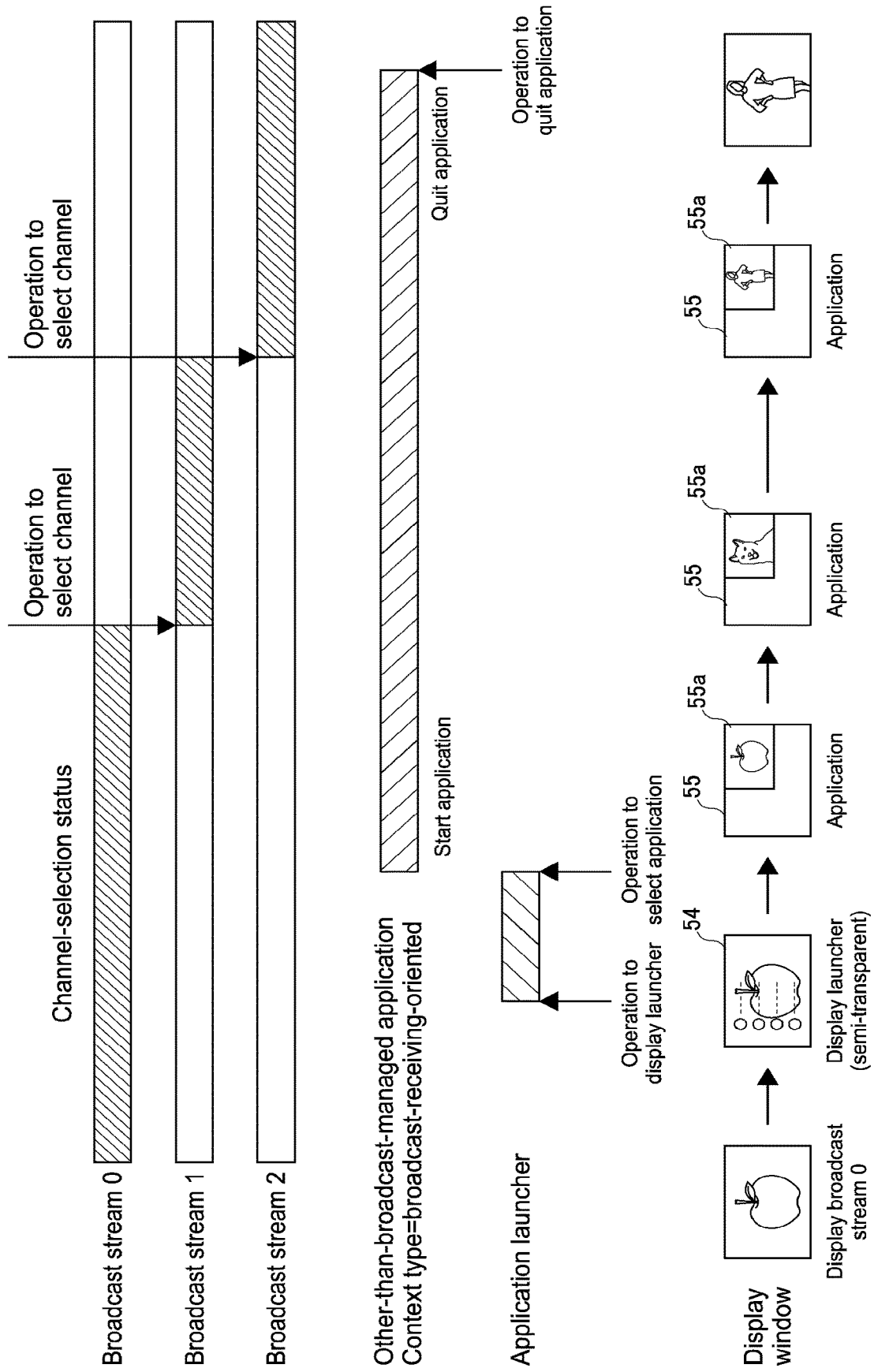
FIG. 36 A diagram illustrating a broadcast-receiving-oriented other-than-broadcast-managed application, and the behavior thereof depending on operations to the other-than-broadcast-managed application by a user.

FIG. 36 is a diagram illustrating a broadcast-receiving-oriented other-than-broadcast-managed application, and the behavior thereof depending on operations to the other-than-broadcast-managed application by a user.

The channel of a broadcast stream 0 is selected. Then a user of the information processing apparatus 700 operates an application launcher button of a remote controller, for example. As a result, the display unit of the information processing apparatus 700 displays an application launcher 54.

Note that it may be possible to select only broadcast-receiving-oriented other-than-broadcast-managed applications by using the application launcher 54. In this case, a semi-transparent application launcher 54 may be displayed on the image of the broadcast stream 0, which is selected at this time.

The user selects an other-than-broadcast-managed application by using the application launcher 54. Then the application controller 708 of the information processing apparatus 700 starts the other-than-broadcast-managed application based on the XML-AIT of the other-than-broadcast-managed application. At this time, the application controller 708 refers to the XML-AIT, and checks the context type of the other-than-broadcast-managed application.

Here, it is assumed that the context type of the other-than-broadcast-managed application, which is selected by the user, is the broadcast-receiving-oriented type. In this case, a broadcast service, which is displayed as an object element, is a broadcast stream selected by a user.

In this example, it is assumed that a page 55 of the other-than-broadcast-managed application is configured to provide a broadcast stream selected by a user as a broadcast service, which is displayed as an object element. In other words, the pages 55 is configured to display a child screen 55*a* on the page 55, and the child screen 55*a* displays the image of the broadcast stream of the broadcast station selected by a user.

When the page 55 of the other-than-broadcast-managed application is displayed (other-than-broadcast-managed application is running), a user selects another broadcast stream. Then the image of the newly-selected broadcast stream is displayed on the child screen 55*a* on the page 55. For example, FIG. 36 shows that the image of the broadcast stream 0 is firstly displayed on the child screen 55*a*. Every time a user operates the information processing apparatus 700 to select a channel, the image of the broadcast stream 0, the image of the broadcast stream 1, and the image of the broadcast stream 2 are displayed on the child screen 55*a* in order.

The user operates the information processing apparatus 700 to quit the other-than-broadcast-managed application. Then the other-than-broadcast-managed application is quit. When the other-than-broadcast-managed application is quit, the channel-selection status of a broadcast stream is decided based on the context type.

The context type of the other-than-broadcast-managed application, which is started this time, is the broadcast-receiving-oriented type. In this case, the application controller 708 of the information processing apparatus 700 quits the other-than-broadcast-managed application. After that, the application controller 708 displays the selected broadcast stream as it is.

Effects Etc. of First Embodiment

According to this embodiment, the following effects can be obtained.

1. The application controller 708 controls the scope of a broadcast resource that can be used by an other-than-broadcast-managed application based on an external application control descriptor of a section AIT. As a result, the following scheme is realized. The broadcast station side is capable of dynamically changing, by using the section AIT, the scope of the use-permission information set for an XML-AIT, which is created by a third party such as a provider of an other-than-broadcast-managed application.

As a result, it is possible to change how to operate an other-than-broadcast-managed application depending on changes in an ongoing program, programming, or the like.

This is effective for a broadcast program, whose time schedule is uncertain, such as sport live broadcasting, for example.

Further, if it is assumed that an other-than-broadcast-managed application uses broadcast resources of a plurality of channels (broadcast stations), the operation of the other-than-broadcast-managed application can be controlled depending on each broadcast station.

2. The application controller 708 stores a permission bitmap, i.e., binary data of service use-permission information on an XML-AIT, in a memory. The application controller 708 compares the permission bitmap stored in the memory to a permission bitmap of a section AIT, which is obtained after the other-than-broadcast-managed application is started, based on binary operation. As a result, the application controller 708 can obtain the difference between those permission bitmaps. As a result, the load on the application controller 708 of the information processing apparatus 700 is reduced, and the application controller 708 of the information processing apparatus 700 may operate at high speed.

3. The application controller 708 controls the position of an other-than-broadcast-managed application displayed on a display window based on an external application control descriptor of a section AIT. As a result, the following scheme is realized. The broadcast station side is capable of dynamically changing, by using the section AIT, the scope of the use-permission information set for an XML-AIT, which is created by a third party such as a provider of an other-than-broadcast-managed application.

4. Because an XML-AIT includes the expire date 22, if the information processing apparatus 700 is offline, the application controller 708 is capable of invalidating start of an other-than-broadcast-managed application based on an expired XML-AIT cached in the information processing apparatus 700. As a result, a problem, in which intention to update an XML-AIT is not reflected in the control of the operation of an other-than-broadcast-managed application at all, is solved.

5. The application controller 708 is capable of variously controlling display modes of a broadcast image and an other-than-broadcast-managed application based on an area type of the application type descriptor 25, which is described in an XML-AIT.

6. The application controller 708 is capable of determining if a running other-than-broadcast-managed application is packaged or web-based based on the format type of the application type descriptor 25, which is described in an XML-AIT. If a hash value is calculated based on different files depending on the packaged or web-based type, the application controller 708 can recognize files, from which a hash value is calculated, based on a format type.

7. After an other-than-broadcast-managed application is quit, the application controller 708 is capable of selecting the optimum channel-selection status of a broadcast image based on the context type of the application type descriptor 25, which is described in an XML-AIT.

According to the above-mentioned embodiment, it is assumed that HbbTV standard is employed. However, the present technology is not necessarily limited to the supposition, in which HbbTV standard is employed.

[Other Configurations of the Present Technology]
The present technology may also employ the following configurations.

(1) An information processing apparatus, including:
a broadcast receiver capable of receiving a broadcast signal; and
a controller configured
to obtain at least
information used to control an operation of an application, the application using a broadcast signal received by the broadcast receiver, and
an application information table describing information on an expire date,
to determine if the expire date of the obtained application information table is expired or not based on information on the expire date, and
to invalidate start of the application based on the application information table if the controller determines that the expire date is expired.

(2) The information processing apparatus according to (1), in which
the controller is configured
to store the application information table obtained the latest, and
to determine if the expire date of the application information table is expired or not based on the information on the expire date, the information being described in the stored application information table.

(3) The information processing apparatus according to (1) or (2), in which
the controller is configured to determine if the expire date of the application information table is expired or not if a user selects the application to be started.

(4) The information processing apparatus according to any one of (1) to (3), in which
the controller is configured to control operation of the application based on the stored application information table when the information processing apparatus is offline.

(5) The information processing apparatus according to any one of (1) to (4), in which
the controller is configured to obtain the application via communication.

(6) The information processing apparatus according to any one of (1) to (5), in which
the controller is configured to obtain the application information table via communication.

In addition, the present technology is not limited to the embodiment described above and can be variously modified without departing from the gist of the present invention.

DESCRIPTION OF REFERENCE NUMERALS

100 broadcast station
200 first network
300 application server
400 XML-AIT server
600 second network
700 information processing apparatus
701 broadcast interface
702 demultiplexer
703 output processor
704 image decoder
705 sound decoder
706 subtitle decoder
707 communication interface
708 application controller
800 store server 800

The invention claimed is:
1. An information processing apparatus, comprising:
a communication interface configured to communicate with a communication network via a first communication medium;

a broadcast receiver configured to receive a broadcast signal via a second communication medium different from the first communication medium; and processing circuitry configured to:
- store an application information table associated with an application, the application information table being previously obtained from the communication network via the first communication medium by the communication interface, the application information table including a permission bitmap and permission scope information, the permission bitmap being stored in a memory as a stored permission bitmap and specifying a scope of use-permission for the application, and the permission scope information specifying a scope of broadcast resources to which the permission bitmap is applicable;
- obtain control information from the broadcast signal received via the second communication medium by the broadcast receiver, the control information including an updated permission bitmap;
- update the stored permission bitmap stored in the memory according to the updated permission bitmap obtained from the control information;
- determine whether the information processing apparatus is communicatively connected to the network or not communicatively connected to the network;
- in a case that the information processing apparatus is determined to be communicatively connected to the network,
  - determine whether a latest application information table stored in a server is newer than the previously obtained application information table, and
  - obtain the latest application information table from the server to update the previously obtained application information table stored in the information processing apparatus, when the latest application information table stored in the server is determined to be newer than the previously obtained application information table; and
- in response to a user selection to start the application,
  - determine if an application information table currently stored in the information processing apparatus and associated with the application is expired or not based on expiration date information included in the currently stored application information table,
  - execute the application according to the currently stored application information table and the stored permission bitmap when the currently stored application information table is determined to be not expired, and
  - invalidate start of the application when the currently stored application information table is determined to be expired.

2. The information processing apparatus according to claim 1, wherein the processing circuitry is configured to:
store the latest application information table obtained from the server in place of the previously obtained application information table when the latest application information table stored in the server is determined to be newer than the previously obtained application information table.

3. The information processing apparatus according to claim 1, wherein the processing circuitry is configured to determine if the currently stored application information table is expired or not in response to the user selection to start the application.

4. The information processing apparatus according to claim 1, wherein the processing circuitry is configured to obtain the application from the communication network via the first communication medium.

5. An information processing method, comprising:
- storing an application information table associated with an application, the application information table being previously obtained from a communication network via a first communication medium by a communication interface of an information process apparatus, the application information table including a permission bitmap and permission scope information, the permission bitmap being stored in a memory as a stored permission bitmap and specifying a scope of use-permission for the application, and the permission scope information specifying a scope of broadcast resources to which the permission bitmap is applicable;
- obtaining control information from a broadcast signal received via a second communication medium by a broadcast receiver of the information process apparatus, the second communication medium being different from the first communication medium, and the control information including an updated permission bitmap;
- updating the stored permission bitmap stored in the memory according to the updated permission bitmap obtained from the control information;
- determining, using processing circuitry of the information process apparatus, whether the information processing apparatus is communicatively connected to the network or not communicatively connected to the network;
- in a case that the information processing apparatus is determined to be communicatively connected to the network,
  - determining whether a latest application information table stored in a server is newer than the previously obtained application information table, and
  - obtaining the latest application information table from the server to update the previously obtained application information table stored in the information processing apparatus, when the latest application information table stored in the server is determined to be newer than the previously obtained application information table; and
- in response to a user selection to start the application,
  - determining if an application information table currently stored in the information processing apparatus and associated with the application is expired or not based on expiration date information included in the currently stored application information table,
  - executing the application according to the currently stored application information table and the stored permission bitmap when the currently stored application information table is determined to be not expired, and
  - invalidating start of the application when the currently stored application information table is determined to be expired.

6. The information processing method according to claim 5, wherein the obtaining the latest application information table from the server to update the previously obtained application information table stored in the information processing apparatus includes:
storing the latest application information table obtained from the server in place of the previously obtained application information table.

7. The information processing method according to claim 5, wherein the determining if the application information table currently stored in the information processing apparatus and associated with the application is expired or not is performed in response to the user selection to start the application.

8. The information processing method according to claim 5, further comprising obtaining the application from the communication network via the first communication medium by the communication interface.

9. An information processing apparatus, comprising:
a communication interface configured to communicate with a network via a first communication medium;
a broadcast receiver configured to receive a broadcast signal via a second communication medium different from the first communication medium; and
processing circuitry configured to:
obtain an application information table associated with an application from the communication network via the first communication medium by the communication interface, the application information table including a permission bitmap and permission scope information, the permission bitmap specifying a scope of use-permission for the application, and the permission scope information specifying a scope of broadcast resources to which the permission bitmap is applicable;
store the permission bitmap obtained from the application information table in a memory as a stored permission bitmap;
obtain control information from the broadcast signal received via the second communication medium by the broadcast receiver, the control information including an updated permission bitmap;
update the stored permission bitmap stored in the memory according to the updated permission bitmap obtained from the control information;
in response to a user selection to stall the application,
determine if the obtained application information table is expired based on expiration date information included in the obtained application information table,
execute the application according to the obtained application information table and the stored permission bitmap when the obtained application information table is determined to be not expired, and
invalidate start of the application when the obtained application information table is determined to be expired.

10. The information processing apparatus according to claim 9, wherein the processing circuitry is configured to obtain the application from the communication network via the first communication medium.

11. The information processing apparatus according to claim 9, wherein the processing circuitry is configured to:
determine the scope of broadcast resources to which the permission bitmap is applicable as all broadcast resources when a parameter provided in the permission scope information has a first value; and
determine the scope of broadcast resources to which the permission bitmap is applicable as a set of broadcast resources associated with an identifier provided in the permission scope information when the parameter provided in the permission scope information has a second value.

* * * * *